US012533690B2

(12) United States Patent
Pellin et al.

(10) Patent No.: US 12,533,690 B2
(45) Date of Patent: Jan. 27, 2026

(54) STATIONARY MIX CHAMBER

(71) Applicant: Graco Minnesota Inc., Minneapolis, MN (US)

(72) Inventors: Christopher J. Pellin, Victoria, MN (US); Joseph E. Tix, Hastings, MN (US); Justin J. Weldon, Belle Plaine, MN (US); John R. Ingebrand, New Prague, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 316 days.

(21) Appl. No.: 18/038,891

(22) PCT Filed: Dec. 1, 2021

(86) PCT No.: PCT/US2021/061382
§ 371 (c)(1),
(2) Date: May 25, 2023

(87) PCT Pub. No.: WO2022/140027
PCT Pub. Date: Mar. 30, 2022

(65) Prior Publication Data

US 2024/0091797 A1 Mar. 21, 2024

Related U.S. Application Data

(60) Provisional application No. 63/121,410, filed on Dec. 4, 2020.

(51) Int. Cl.
*B05B 7/04* (2006.01)
*B05B 1/30* (2006.01)

(52) U.S. Cl.
CPC ............ *B05B 7/0408* (2013.01); *B05B 1/306* (2013.01)

(58) Field of Classification Search
CPC .............................. B05B 7/0408; B05B 1/306
USPC ...................................... 239/413, 417.5, 421
See application file for complete search history.

(56) References Cited

U.S. PATENT DOCUMENTS

| | | | | |
|---|---|---|---|---|
| 4,708,292 | A | 11/1987 | Gammons | |
| 5,086,949 | A | 2/1992 | Vulpitta et al. | |
| 6,283,329 | B1 | 9/2001 | Bezaire et al. | |
| 6,315,161 | B1 * | 11/2001 | Bezaire | B29B 7/7447 222/149 |
| 11,413,635 | B2 * | 8/2022 | Ross | B05B 7/2497 |
| 2005/0035220 | A1 | 2/2005 | Brown | |

(Continued)

FOREIGN PATENT DOCUMENTS

| | | | |
|---|---|---|---|
| CN | 102198433 | B | 6/2014 |
| CN | 108367304 | A | 8/2018 |

(Continued)

OTHER PUBLICATIONS

International Preliminary Report on Patentability for PCT Application No. PCT/US2021/061382, Dated Jun. 15, 2023, pp. 10.

(Continued)

*Primary Examiner* — Christopher S Kim
(74) *Attorney, Agent, or Firm* — Kinney & Lange, P.A.

(57) ABSTRACT

A fast-set, plural component, spray applicator (12) includes a stationary mix chamber (48) to eliminate dynamic metal-to-metal high pressure fluid sealing. The stationary mix chamber (48) mixes the plural components before dispensing the mixed components from the spray applicator.

17 Claims, 19 Drawing Sheets

(56) References Cited

U.S. PATENT DOCUMENTS

| | | | | |
|---|---|---|---|---|
| 2015/0108254 | A1 | 4/2015 | Commette et al. | |
| 2020/0129998 | A1* | 4/2020 | Ross | B05B 15/55 |

FOREIGN PATENT DOCUMENTS

| | | | |
|---|---|---|---|
| EP | 0550594 | A1 | 7/1993 |
| WO | 2021081342 | A1 | 4/2021 |

OTHER PUBLICATIONS

International Search Report and Written Opinion for PCT Application No. PCT/US2021/061382, Dated May 16, 2022.
Communication Pursuant to Rules 161(1) and 162 EPC for EP Application No. 21881354.1, Dated Jul. 11, 2023.
First Office Action for Chinese Patent Application No. 202180081121.1 Dated Jul. 23, 2025, 15 Pages.

* cited by examiner

STATIONARY MIX CHAMBER

CROSS-REFERENCE TO RELATED APPLICATION(S)

This application claims the benefit of U.S. Provisional Application No. 63/121,410 filed Dec. 4, 2020 and entitled "STATIONARY MIX CHAMBER," the disclosure of which is hereby incorporated by reference in its entirety.

BACKGROUND

This disclosure relates generally to spray applicators. More specifically, this disclosure relates to mix chambers in spray applicators.

Spray applicators can be used for various purposes, but two common uses are spray foam insulation and elastomer coatings. Spray foam insulation is applied to substrates to provide thermal insulation from the environment. Elastomer coatings can be applied to a substrate to protect a surface, an example is a spray-in truck bed liner. In either application, two or more components are mixed within the spray applicator causing a chemical reaction to occur. The ratio of the mixture is highly controlled and the end result is a component mixture having the desired physical properties, which depends on the specific application. Fast-set, plural component, air purge applicators generally use a dynamic metal-to-metal high pressure seal to control flow of the plural components within the spray applicator. Dynamic, metal-to-metal high pressure sealing requires hardened steel and a multi-process, precision machining operation to achieve the proper sealing surfaces and material characteristics.

SUMMARY

According to one aspect of the disclosure, a stationary mix chamber for use in a plural component sprayer having a sprayer body, a spray valve configured to control flow of first and second component materials to a receiving chamber of the plural component sprayer, and a trigger operatively connected to the spray valve to control actuation of the spray valve to move relative to the receiving chamber and between a first position allowing the first and second component materials to flow to the receiving chamber through first and second flowpaths to place the plural component sprayer in a spray state, respectively, and a second position preventing the first and second component materials from flowing through the first and second flowpaths to the receiving chamber to place the plural component sprayer in a non-spray state. The stationary mix chamber includes a body extending between a first end and a second end and configured to mount within the receiving chamber; an outlet extension extending from the second end; a first inlet port and a second inlet port extending into the body, the first inlet port configured to align with the first flowpath with the plural component sprayer in the spray state and in the non-spray state and the second inlet port configured to align with a second flowpath with the plural component sprayer in both the spray state and the non-spray state; an outlet port formed in a distal end of the outlet extension; and a flowpath extending through the body and the outlet extension, the flowpath fluidly connecting the first inlet port to the outlet port and fluidly connecting the second inlet port to the outlet port.

DETAILED DESCRIPTION

Figure 1:
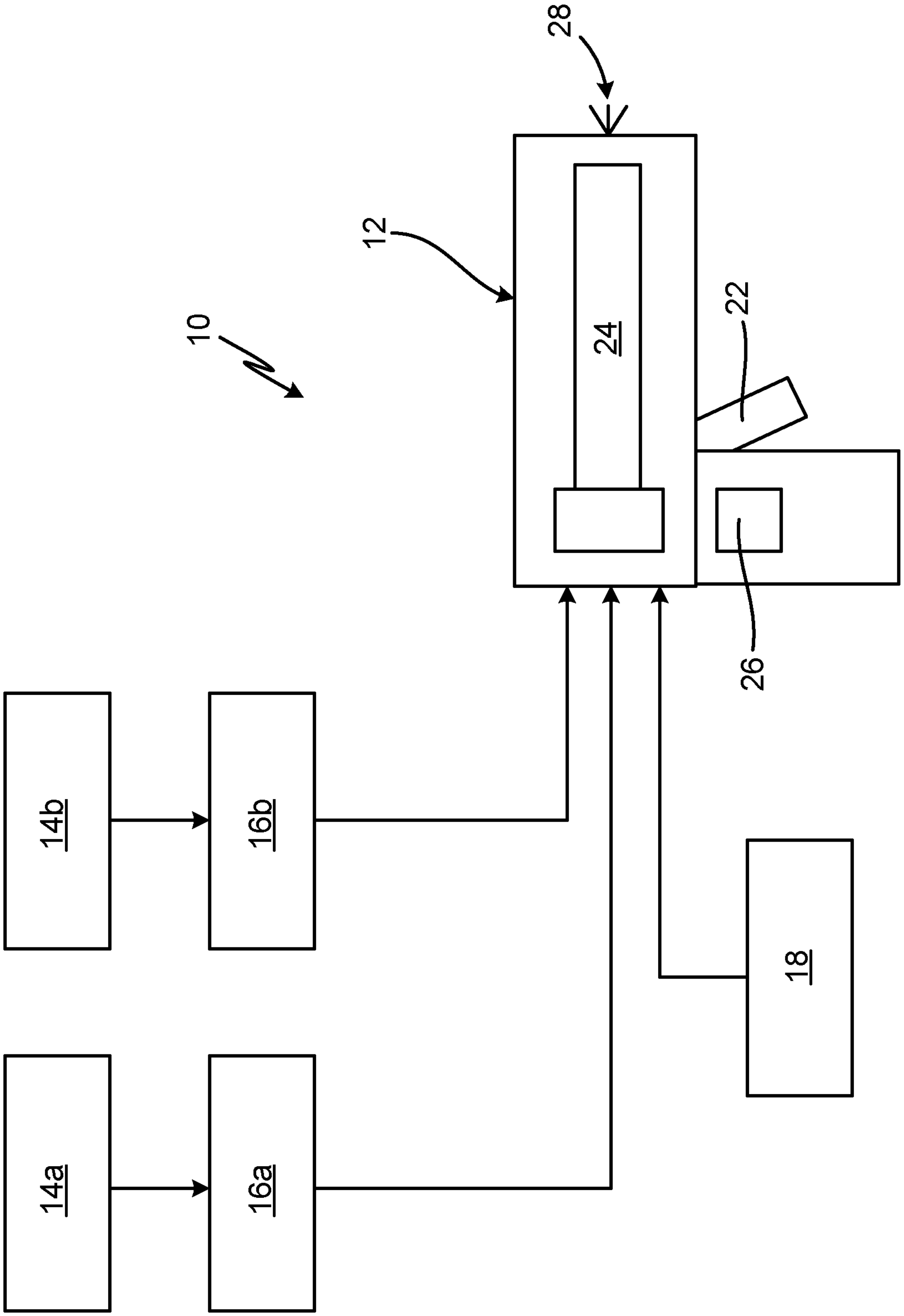
FIG. 1 is a schematic block diagram of a spray system.

FIG. 1 is a schematic block diagram of spray system 10. Spray system 10 includes spray applicator 12, fluid supplies 14*a* and 14*b*, pumps 16*a* and 16*b*, and air supply 18. Spray applicator 12 includes trigger 22, spray valve 24, control valve 26, and spray orifice 28.

Spray system 10 is a system configured to generate a fluid spray and apply the fluid spray to a substrate. In some examples, spray system 10 is configured to combine two or more fluids to generate a plural component fluid spray for application to the substrate. In some examples, spray system 10 is configured to generate and apply a coating of spray foam insulation or elastomer onto the substrate. While spray system 10 is described as applying plural component fluids, it is understood that spray system 10 can be configured to spray a single fluid.

Fluid supplies 14*a*, 14*b* store fluids prior to spraying. The plural component fluid can be formed from multiple fluids that combine to create the spray foam or elastomer. For example, fluid supply 14*a* can store a first fluid, such as a resin, and fluid supply 14*b* can store a second fluid, such as a catalyst. The first and second fluids combine at spray applicator 12 and are ejected from spray applicator 12 as a spray of the plural component fluid. As such, spray applicator 12 can alternatively be referred to as a mixer, mixing manifold, dispenser, and/or gun. Spray applicator 12 generates the spray of the plural component fluid and applies the plural component fluid onto the substrate.

Pump 16*a* is configured to draw the first fluid from fluid supply 14*a* and transfer the first fluid downstream to spray applicator 12. Pump 16*b* is configured to draw the second fluid from fluid supply 14*b* and transfer the second fluid downstream to spray applicator 12. Pumps 16*a*, 16*b* can be controlled by a system controller. Likewise, air supply 18 is connected to spray applicator 12 and configured to provide a flow of compressed air to spray applicator 12. Air supply 18 can be of any suitable configuration for providing the compressed air to spray applicator 12. For example, air supply 18 can be a compressor, a pressurized tank, or of any other suitable configuration.

Spray applicator 12 is configured to receive the fluids and generate a spray of the fluids. Trigger 22 is attached to spray applicator 12 and configured to control the spraying of spray applicator 12. The user actuates trigger 22 to cause spray valve 24 to shift to a fluid open position, thereby opening a fluid flow path through spray applicator 12 to spray orifice 28. It is understood that trigger 22 can be of any configuration suitable for activating and deactivating the spraying of spray applicator 12. The user releases trigger 22 to cause spray valve 24 to shift to the fluid closed position, thereby closing the fluid flow path through spray orifice 28.

Trigger 22 actuates control valve 26 such that control valve 26 causes spray valve 24 to shift between the fluid open position and the fluid closed position. In some examples, control valve 26 directs compressed air from air supply 18 to spray valve 24 to drive spray valve 24 between the fluid open position and the fluid closed position. In some examples, control valve 26 shifts between a first position and a second position to direct the air and drive spray valve 24. For example, control valve 26 can direct the air through a first internal pathway within spray applicator 12 to drive spray valve 24 from the fluid closed position to the fluid open position when control valve 26 is in one of the first position and the second position. Control valve 26 can then shift to the other of the first position and the second position to direct the air through a second internal pathway within spray applicator 12 and drive spray valve 24 from the fluid open position to the fluid closed position.

In operation, the user actuating trigger 22 causes control valve 26 to shift and direct air to spray valve 24 to cause spray valve 24 to shift to the fluid open position. Spray valve 24 is maintained in the fluid open position until the user releases trigger 22. Upon release of trigger 22, control valve 26 shifts back and directs air to spray valve 24 to cause spray valve 24 to shift to the fluid closed position. In some examples, spray valve 24 is maintained in the fluid open position with trigger 22 actuated and spray valve 24 is returned to the fluid closed position upon release of trigger 22.

Figure 2A:
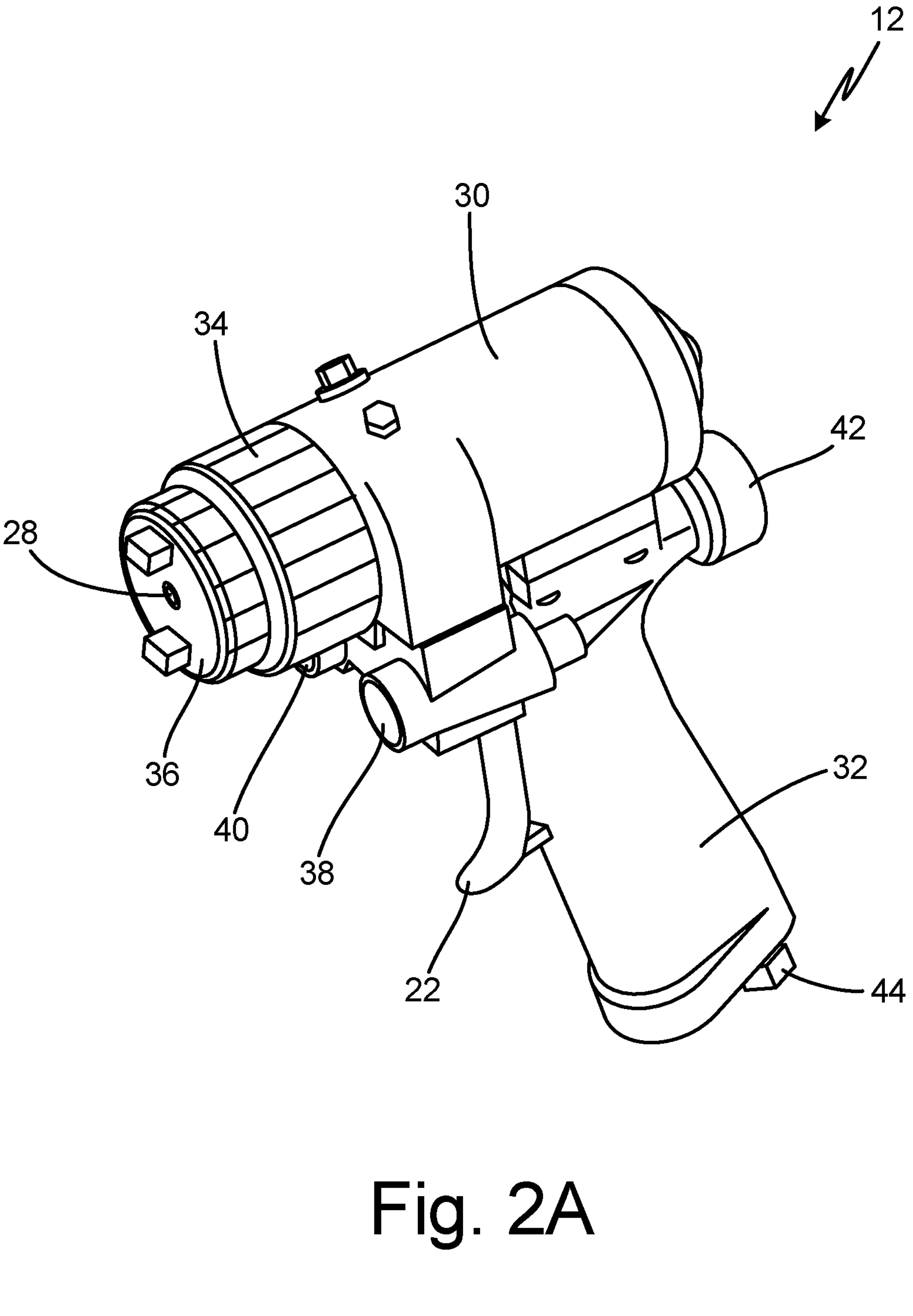
FIG. 2A is a perspective view of a spray applicator.
Figure 2B:
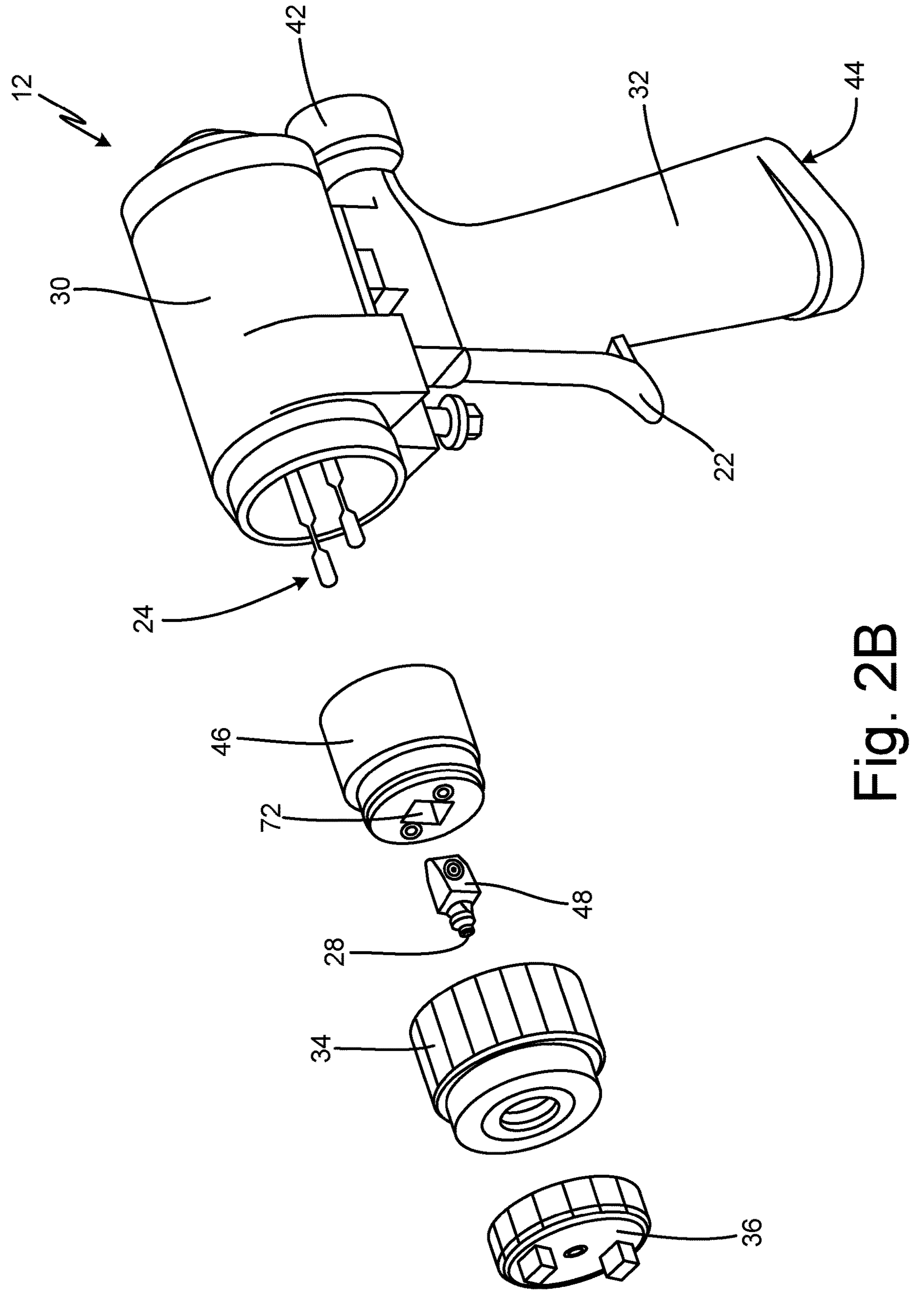
FIG. 2B is an exploded perspective view of the spray applicator.

FIG. 2A is a perspective view of spray applicator 12. FIG. 2B is an exploded perspective view of spray applicator 12. FIGS. 2A and 2B will be discussed together. Spray applicator 12 includes trigger 22, spray valve 24 (FIG. 2B), spray orifice 28, body 30, grip 32, retaining cap 34, air cap 36, first fluid manifold 38, second fluid manifold 40, air receiver 42, air exhaust 44, fluid housing 46, and stationary mix chamber 48

Body 30 is the main protective housing that covers the internal components of spray applicator 12. Further, body 30 provides connection points for the other components of spray applicator 12. Grip 32 is connected to body 30 and provides a handle for the user to hold onto while using spray applicator 12. Grip 32 also provides cover and protection to internal components of spray applicator 12. Trigger 22 is connected to body 30 and configured to control the spraying of spray applicator 12. Retaining cap 34 is connected to body 30 and configured to protect and secure internal components within spray applicator 12. Retaining cap 34 is removable from body 30, allowing the user access to the internal components of spray applicator 12, such as fluid housing 46 and stationary mix chamber 48. Air cap 36 is attached to retaining cap 34 and configured to secure internal components within spray applicator 12 and direct clean-off air proximate spray orifice 28. Air cap 36 is removable from retaining cap 34, allowing the user access to the internal components of spray applicator 12, such as fluid housing 46 and stationary mix chamber 48.

First fluid manifold 38 and second fluid manifold 40 are each adjacent and connected to body 30. First fluid manifold 38 is configured to receive a first fluid from fluid supply 14*a* (FIG. 1), with pump 16*a* (FIG. 1) transferring the first fluid from fluid supply 14*a* to spray applicator 12. Second fluid manifold 40 is configured to receive a second fluid from fluid supply 14*b*, with pump 16*b* transferring the second fluid from fluid supply 14*b* to spray applicator 12. In the example shown, first fluid manifold 38 and second fluid manifold 40 are formed as a single manifold mounted to spray applicator 12. In the embodiment shown, the first fluid and the second fluid can be received by spray applicator 12, mixed within spray applicator 12, and then dispensed from spray orifice 28 onto a substrate. In another embodiment, spray applicator 12 can receive fluid from a single fluid receiver and dispense a single fluid from spray orifice 28 onto a substrate.

In the embodiment shown, air receiver 42 is connected to a rear portion of grip 32. In another embodiment, air receiver 42 can be connected to a bottom portion of grip 32. As such, spray applicator 12 can include multiple air receivers 42, only one of which is connected to air supply 18 (FIG. 1) at any given time. Air receiver 42 is configured to receive air from air supply 18. In operation, a user connects air supply 18 to air receiver 42 using a hose, tube, pipe, or other standard connection. Air exhaust 44 is disposed at a bottom portion of grip 32. Air exhaust 44 is configured to expel air from spray applicator 12 during the translation of spray valve 24.

In some cases, spray applicator 12 may require disassembly and replacement of parts. More specifically, the pathways within fluid housing 46 and/or stationary mix chamber 48 can become clogged due to solidified fluid and/or degradation of the internal components and the parts may need to be replaced. To disassemble spray applicator 12, the user removes air cap 36 from retaining cap 34, allowing access to stationary mix chamber 48. Stationary mix chamber 48 can then be removed from fluid housing 46, and more specifically removed from contoured cavity 72 of fluid housing 46. The contoured cavity 72 can also be referred to as a mix chamber cavity or a receiving cavity or chamber. With stationary mix chamber 48 removed the user can remove retaining cap 34 from body 30, exposing fluid housing 46. Fluid housing 46 can then be slid over spray valve 24 and removed from body 30 of spray applicator 12. When removing fluid housing 46, seals within fluid housing 46 wipe residue from spray valve 24, increasing efficiency during disassembly. Spray applicator 12 can be assembled by reversing the process. Fluid housing 46 is inserted into spray applicator 12 and receives the needles of spray valve 24. Mix chamber 48 is inserted into contoured cavity 72. Retaining cap 34 is secured to spray applicator 12, thereby securing fluid housing 46 to spray applicator 12. Air cap 36 is connected to retaining cap 34 and further presses mix chamber 48 into contoured cavity 72, enhancing sealing therebetween.

The quick assembly and disassembly of spray applicator 12 reduces downtime and increases productivity in the event that fluid housing 46 and/or stationary mix chamber 48 need to be removed for repair or removed and replaced. Further, fluid housing 46 contains the seals that engage spray valve 24, and containment of the multiple components within fluid housing 46 increases efficiency of the assembly and disassembly process. In addition, any crossover of fluid is limited to fluid housing 46 and stationary mix chamber 48, which can be easily replaced.

Figure 3A:
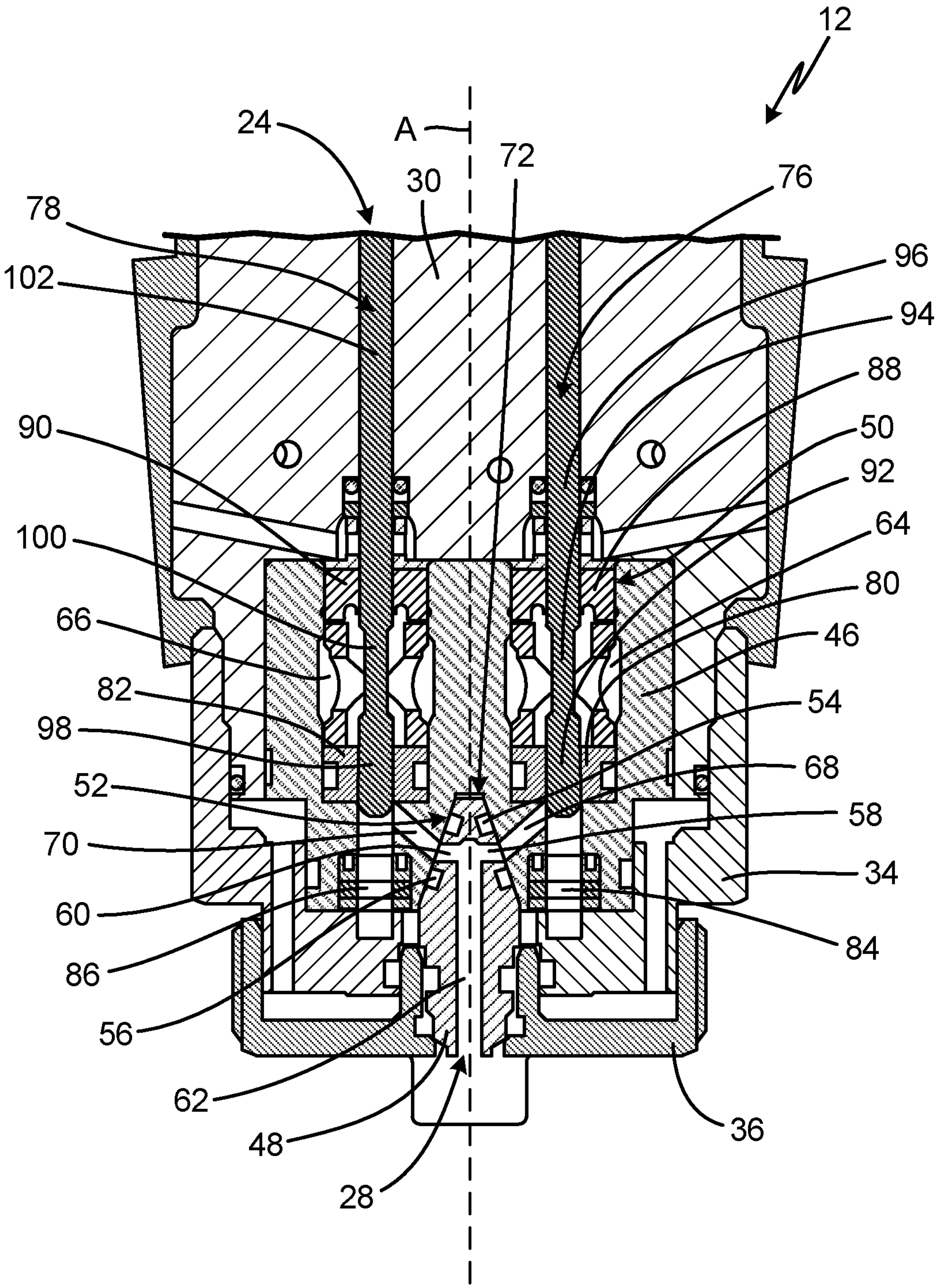
FIG. 3A is a cross-sectional view of a spray applicator in a fluid closed state.
Figure 3B:
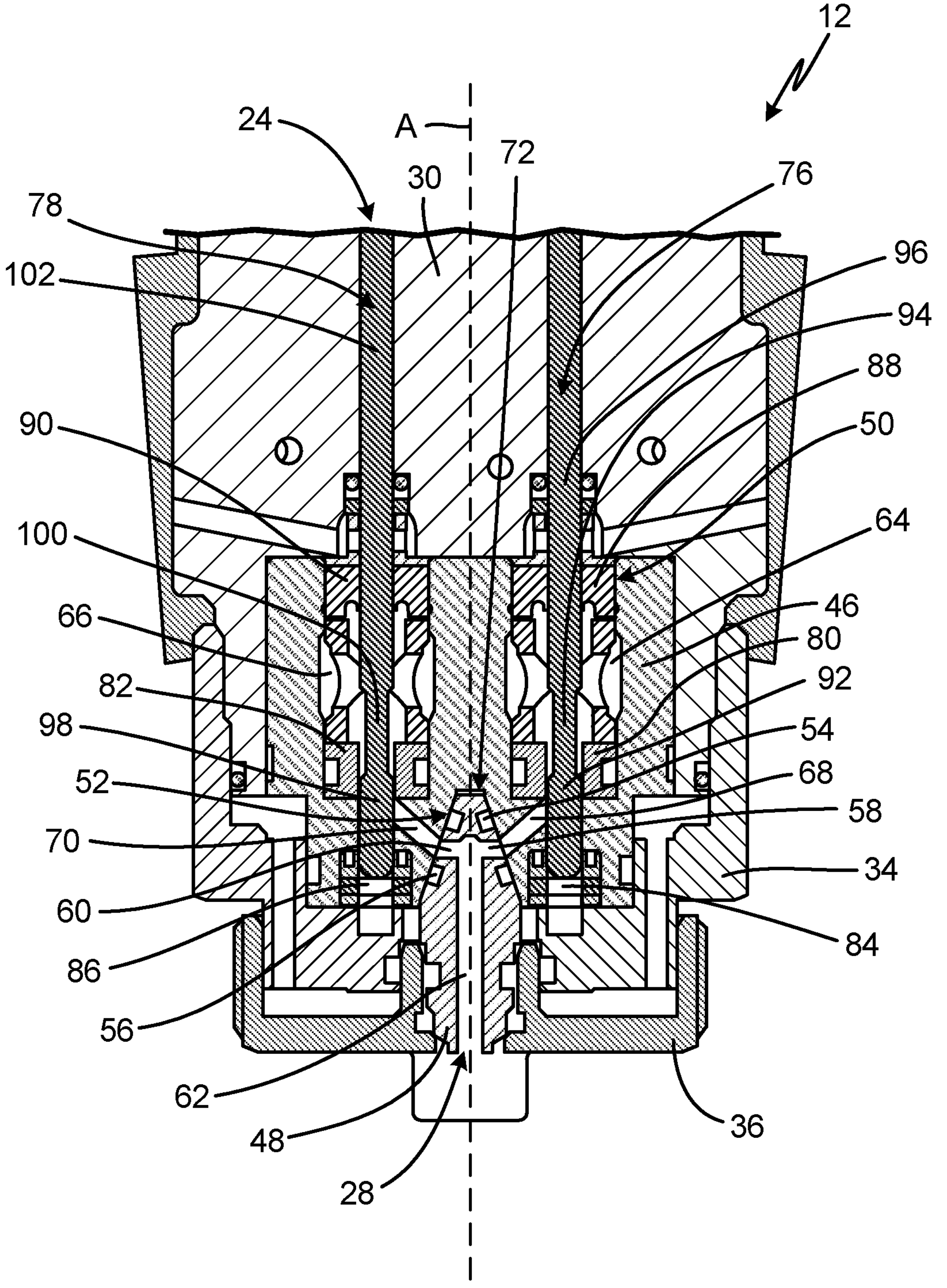
FIG. 3B is a cross-sectional view of a spray applicator in an intermediate state.
Figure 3C:
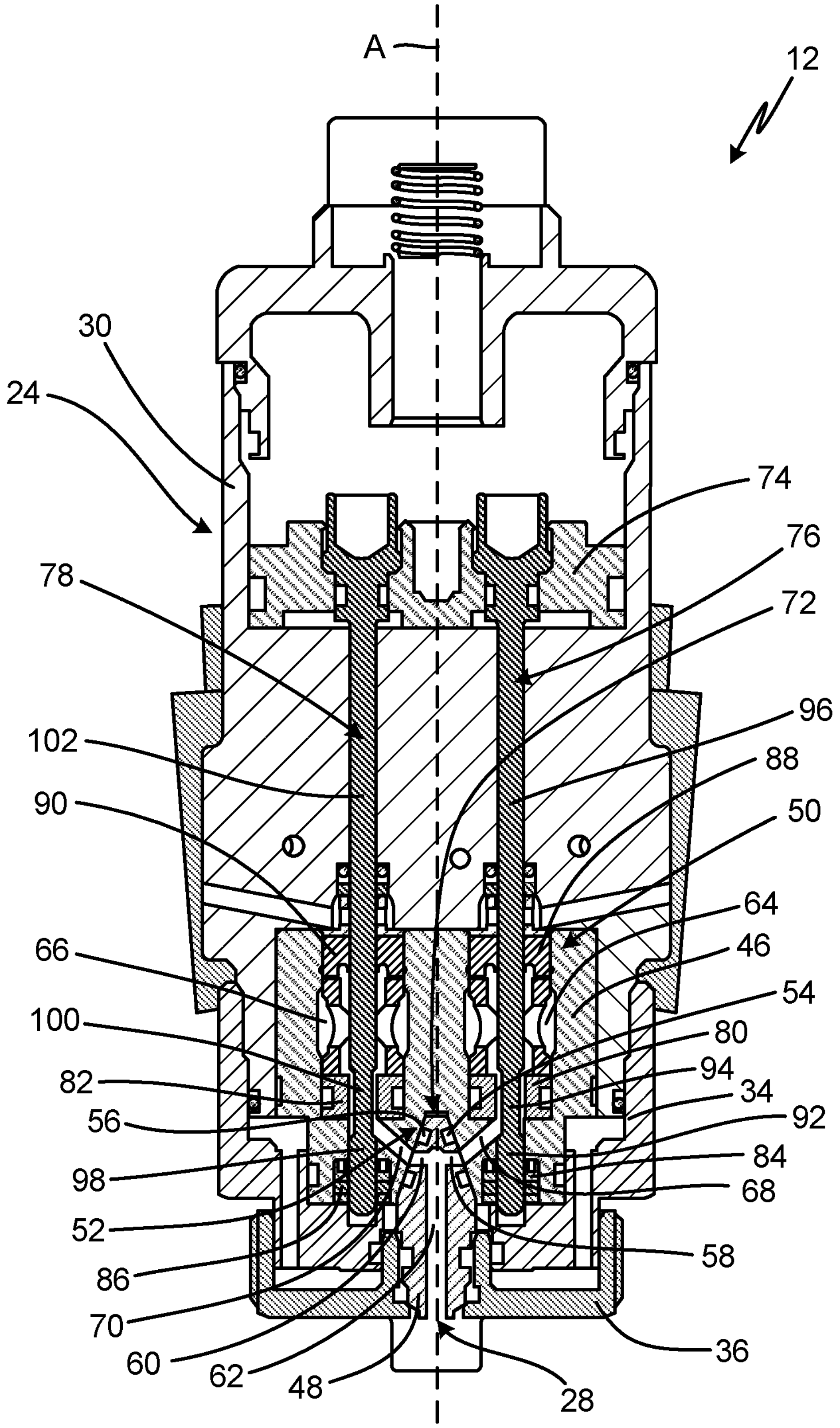
FIG. 3C is a cross-sectional view of a spray applicator in a fluid open state.

FIG. 3A is a cross-sectional view of spray applicator 12 showing spray valve 24 in a fluid closed position. FIG. 3B is a cross-sectional view of spray applicator 12 showing spray valve 24 in an intermediate position. FIG. 3C is a cross-sectional view of spray applicator 12 showing spray valve 24 in a fluid open position. FIGS. 3A-3C will be discussed together. Spray applicator 12 includes body 30, retaining cap 34, air cap 36, fluid housing 46, stationary mix chamber 48, and valve assembly 50. Stationary mix chamber 48 includes spray orifice 28, contoured end 52, first seal groove 54, second seal groove 56, first port 58, second port 60, and mixing bore 62. Fluid housing 46 includes first bore 64, second bore 66, first outlet 68, second outlet 70, and contoured cavity 72. Spray valve 24 includes valve assembly 50 and pneumatic piston 74 (FIG. 3C). Valve assembly 50 includes first fluid needle 76, second fluid needle 78, first valving seal 80, second valving seal 82, first air seal 84, second air seal 86, first fluid seal 88, and second fluid seal 90.

It is understood that spray applicator 12 is a plural component spray applicator that includes a mixing apparatus. The mixing apparatus includes all of the internal components within spray applicator 12 that allows spray applicator 12 to receive more than one fluid, mix the fluids, and dispense the fluids from spray applicator 12. More specifically, the mixing apparatus can include fluid housing 46, stationary mix chamber 48, and spray valve 24. The mixing apparatus includes all of the features within fluid housing 46 and stationary mix chamber 48. Further, the mixing apparatus includes all of the features and components within spray valve 24, as defined above.

As discussed in FIG. 2, retaining cap 34 is connected to body 30 and air cap 36 is connected to retaining cap 34. Fluid housing 46 is positioned within a cavity in body 30 and secured in place by retaining cap 34. Retaining cap 34 is adjacent to and presses against surfaces of fluid housing 46, holding fluid housing 46 securely in position within spray applicator 12. Fluid housing 46 can be removed from body 30 of spray applicator 12 by first removing retaining cap 34 holding fluid housing 46 in position and then removing fluid housing 46 from the cavity in body 30. Fluid housing 46 may need to be removed from body 30 of spray applicator 12 for various reasons, including but not limited to clogging of pathways in fluid housing 46 due to solidified fluid and/or degradation of internal components of fluid housing 46.

In the embodiment shown, fluid housing 46 includes first bore 64, second bore 66, first outlet 68, second outlet 70, and contoured cavity 72. First bore 64 is an aperture disposed within fluid housing 46 that is configured to receive a first fluid from fluid supply 14*a* (FIG. 1), through first fluid manifold 38, and transfer the first fluid to first outlet 68. Further, first bore 64 houses components of valve assembly 50. Second bore 66 is an aperture disposed within fluid housing 46 and opposite first bore 64 that is configured to receive a second fluid from fluid supply 14*b*, through second fluid manifold 40, and transfer the second fluid to second outlet 70. Further, second bore 66 houses components of valve assembly 50. First outlet 68 is an aperture within fluid housing 46 that is configured to transfer the first fluid from first bore 64 to stationary mix chamber 48 when spray valve 24 is in the fluid open position. Further, first outlet 68 is configured to transfer air from air supply 18 to stationary mix chamber 48 when spray valve 24 is in the fluid closed position. Second outlet 70 is an aperture within fluid housing 46 that is disposed opposite first outlet 68 and configured to transfer the second fluid from second bore 66 to stationary mix chamber 48 when spray valve 24 is in the fluid open position. Further, second outlet 70 is configured to transfer air from air supply 18 to stationary mix chamber 48 when spray valve 24 is in the fluid closed position. Contoured cavity 72 is an orifice in fluid housing 46 that is configured to sealingly accept contoured end 52 of stationary mix chamber 48 to prevent fluid and air leakage.

Stationary mix chamber 48 includes spray orifice 28, contoured end 52, first seal groove 54, second seal groove 56, first port 58, second port 60, and mixing bore 62. Stationary mix chamber 48 is positioned in a cavity between fluid housing 46 and air cap 36. More specifically, contoured end 52 of stationary mix chamber 48 is positioned in contoured cavity 72 of fluid housing 46 and the opposite end of stationary mix chamber 48 extends into air cap 36. Air cap 36 is configured to press against surfaces of stationary mix chamber 48 to secure stationary mix chamber 48 within contoured cavity 72. In the embodiment shown, contoured end 52 is a wedge-shaped end that is configured to be pressed into a wedge-shaped cavity 72 in fluid housing 46. It is understood, however, that contoured end 52 can be any geometrical shape, such as conical or frusto-conical (similar to the conical mix chamber 248 shown in FIGS. 6A-6I), that will facilitate sealing between stationary mix chamber 48 and fluid housing 46. Further, contoured cavity 72 can be of any corresponding shape to receive contoured end 52.

Spray orifice 28 is located at one end of stationary mix chamber 48 and is configured to dispense a fluid in a spray pattern onto a substrate. Contoured end 52 is positioned on the opposite end of stationary mix chamber 48 from spray orifice 28. Contoured end 52 is configured to be pressed into contoured cavity 72 of fluid housing 46 to increase fluid sealing between fluid housing 46 and stationary mix chamber 48. Contoured end 52 also includes first seal groove 54 and second seal groove 56. First seal groove 54 and second seal groove 56 are configured to receive a first seal and a second seal, respectively, to seal between contoured end 52 and contoured cavity 72 and prevent leakage of fluid from first outlet 68 and second outlet 70 into fluid housing 46. In the embodiment shown, first seal groove 54 is positioned on a first surface of stationary mix chamber 28 and configured to surround first port 50. Further, second seal groove 56 is positioned on a second surface of stationary mix chamber 28 and configured to surround second port 60. In other embodiments, first seal groove 54 and second seal groove 56 can circumferentially encompass contoured end 52, with first seal groove 54 positioned above first outlet 68 and second outlet 70, such that the first seal groove 54 is between spray orifice 28 and outlets 68, 70, and second seal groove 56 positioned below first outlet 68 and second outlet 70, such that outlets 68, 70 are between second seal groove 56 and spray orifice 28.

First port 58 is an aperture within stationary mix chamber 48 that is fluidly connected to first outlet 68 of fluid housing 46. First port 58 is configured to receive a first fluid from first outlet 68 and transfer the first fluid to mixing bore 62. Second port 60 is an aperture within stationary mix chamber 48, opposite first port 58, that is fluidly connected to second outlet 70 of fluid housing 46. Second port 60 is configured to receive a second fluid from second outlet 70 and transfer the second fluid to mixing bore 62. Mixing bore 62 is an aperture that is fluidly connected to first port 58 and second port 60 and extends from first port 58 and second port 60 to spray orifice 28. Mixing bore 62 is configured to receive a first fluid from first port 58 and a second fluid from second port 60 and to mix the fluids into a plural component fluid mixture that will be dispensed from spray orifice 28 of stationary mix chamber 48. In the embodiment shown, stationary mix chamber 48 is constructed from a metal. In another embodiment, stationary mix chamber 48 can be constructed from a polymer.

Valve assembly 50 includes first fluid needle 76, second fluid needle 78, first valving seal 80, second valving seal 82, first air seal 84, second air seal 86, first fluid seal 88, and second fluid seal 90. First fluid needle 76 includes first needle head 92, first needle neck 94, and first needle shaft 96. Second fluid needle 78 includes second needle head 98, second needle neck 100, and second needle shaft 102. First fluid needle 76 and second fluid needle 78 can be constructed from one of a metal or a polymer.

Valve assembly 50 is disposed at least partially within first bore 64 and second bore 66 of fluid housing 46. Valve assembly 50 is configured to control the flow of fluid and air through fluid housing 46 to stationary mix chamber 48. More specifically, valve assembly 50 is configured to control the flow of the first fluid to first port 58 and the second fluid to second port 60 of stationary mix chamber 48. Pneumatic piston 74 is disposed within body 30 of spray applicator 12 and is configured to use compressed air from air supply 18 to drive first fluid needle 76 and second fluid needle 78 in a linear manner More specifically, pneumatic piston 74 is configured to cause first fluid needle 76 and second fluid needle 78 to translate axially in a linear manner, with respect to axis A. In the embodiment shown, pneumatic piston 74 is utilized to produce the desired linear motion of first fluid needle 76 and second fluid needle 78. In another embodiment, a hydraulic piston, electric piston, or mechanical piston could be used to produce the desired linear motion of first fluid needle 76 and second fluid needle 78.

First fluid needle 76 is disposed at least partially within first bore 64 of fluid housing 46 and attached to pneumatic piston 74, which is configured to control the translating movement of first fluid needle 76. First fluid needle 76 is configured to translate between a first fluid open position and a first fluid closed position. Second fluid needle 78 is disposed at least partially within first bore 64 of fluid housing 46 and attached to pneumatic piston 74, which is configured to control the translating movement of second fluid needle 78. Second fluid needle 78 is configured to translate between a second fluid open position and a second fluid closed position. First fluid needle 76 and second fluid needle 78 are both operatively connected to pneumatic piston 74 for simultaneous actuation. When spray applicator 12 is in the fluid open state, first fluid needle 76 is in a first fluid open position and second fluid needle 78 is in a second fluid open position. Likewise, when spray applicator 12 is in the fluid closed state, first fluid needle 76 is in a first fluid closed position and second fluid needle 78 is in a second fluid closed position.

First valving seal 80 is disposed within first bore 64 of fluid housing 46. First valving seal 80 is configured to provide a fluid and air tight connection between fluid housing 46 and first needle head 92 of first fluid needle 76 when spray applicator 12 is in the fluid closed state. Second valving seal 82 is disposed within second bore 66 of fluid housing 46. Second valving seal 82 is configured to provide a fluid and air tight connection between fluid housing 46 and second needle head 98 of second fluid needle 78 when spray applicator 12 is in the fluid closed state. First air seal 84 is disposed at least partially within fluid housing 46 and configured to provide a fluid and air tight connection between fluid housing 46 and first needle head 92 when spray applicator 12 is in the fluid open state. Second air seal 86 is disposed at least partially within fluid housing 46 and configured to provide a fluid and air tight connection between fluid housing 46 and second needle head 98 when spray applicator 12 is in the fluid open state.

First fluid seal 88 is disposed within first bore 64 of fluid housing 46. First fluid seal 88 is configured to provide a fluid and air tight connection between fluid housing 46 and first needle shaft 96 of first fluid needle 76. Second fluid seal 90 is disposed within second bore 66 of fluid housing 46. Second fluid seal 90 is configured to provide a fluid and air tight connection between fluid housing 46 and second needle shaft 102 of second fluid needle 78. First fluid seal 88 and second fluid seal 90 are both configured to prevent fluid and air from escaping fluid housing 46 into body 30 of spray applicator 12. Each of first valving seal 80, first air seal 84, and first fluid seal 88 are disposed at least partially within fluid housing 46 and each are configured to sealingly engage a portion of first fluid needle 76. Each of second valving seal 82, second air seal 86, and second fluid seal 90 are disposed at least partially within fluid housing 46 and each are configured to sealingly engage a portion of second fluid needle 78.

In operation, the user squeezes trigger 22 to cause pneumatic piston 74 to actuate from the fluid closed position to the fluid open position, resulting in fluid dispensing from spray applicator 12. FIG. 3A illustrates spray applicator 12 in the fluid closed state. When in the fluid closed position, first fluid needle 76 is sealingly engaged with first valving seal 80 and disengaged from first air seal 84, such that first fluid needle 76 is in the first fluid closed position. When in the fluid closed position, second fluid needle 78 is sealingly engaged with second valving seal 82 and disengaged from second air seal 86, such that second fluid needle 78 is in the second fluid closed position. With first fluid needle 76 in the first fluid closed position, fluid is prevented from flowing out of first bore 64 to stationary mix chamber 48 and air is allowed to travel past first air seal 84, through first outlet 68, and into stationary mix chamber 48 through first port 58. Likewise, with second fluid needle 78 in the second fluid closed position, fluid is prevented from flowing out of second bore 66 to stationary mix chamber 48 and air is allowed to travel past second air seal 86, through second outlet 70, and into stationary mix chamber 48 through second port 60. The air that is allowed to travel to stationary mix chamber 48, known as purge air, is configured to be continuously expelled from spray orifice 28 to keep first port 58, second port 60, and mixing bore 62 free of fluid or other debris.

FIG. 3B illustrates spray applicator 12 in an intermediate state in which both fluid and air flows are simultaneously shut off. The plural component sprayer 12 is in a non-spray state during which the sprayer 12 does not emit the plural component material while in the non-spray state. When the user squeezes trigger 22, spray applicator 12 begins to switch from the fluid closed state to the fluid open state. FIG. 3B illustrates the moment in which both the fluid and the air are prevented from entering stationary mix chamber 48. More specifically, FIG. 3B illustrates the moment that first valving seal 80 and first air seal 84 are simultaneously engaged with first needle head 92 of first fluid needle 76, which occurs at an intermediate position between the first fluid open position and the first fluid closed position. First needle head 92 is sized for simultaneous engagement with first valving seal 80 and first air seal 84. Likewise, FIG. 3B also illustrates the moment that second valving seal 82 and second air seal 86 are simultaneously engaged with second needle head 98 of second fluid needle 78, which occurs at an intermediate position between the second fluid open position and the second fluid closed position. Second needle head 98 is sized for simultaneous engagement with second valving seal 82 and second air seal 86. The intermediate state stops both fluid and airflow from flowing in order to prevent fluid from inadvertently entering air paths and air from inadvertently entering fluid paths.

FIG. 3C illustrates spray applicator 12 in the fluid open state. The plural component sprayer 12 is in a spray state in FIG. 3C such that the first and second component materials can flow to the receiving chamber 72 and to the stationary mix chamber 48 to form the plural component material. When in the fluid open state, first fluid needle 76 is disengaged from first valving seal 80 and sealingly engaged with first air seal 84. Further, when in the fluid open state second fluid needle 78 is disengaged from second valving seal 82 and sealingly engaged with second air seal 86. When in the first fluid open state, air is prevented from flowing past first air seal 84 to stationary mix chamber 48 and fluid is allowed to travel past first needle neck 94, through first outlet 68, and into stationary mix chamber 48 through first port 58. More specifically, the first fluid flows around first needle neck 94 when first fluid needle 76 is extended through first valving seal 80. Likewise, when in the second fluid open state, air is prevented from flowing past second air seal 86 to stationary mix chamber 48 and fluid is allowed to travel past second needle neck 100, through second outlet 70, and into stationary mix chamber 48 through second port 60. More specifically, the second fluid flows around second needle neck 100 when second fluid needle 78 is extended through second valving seal 82. The fluid that flows to travel to stationary mix chamber 48 is mixed within mixing bore 62 and then dispensed from spray orifice 28 as a plural component fluid.

Stationary mix chamber 48 and valve assembly 50 within fluid housing 46 remove the need for dynamic metal-to-metal high pressure fluid sealing that is conventionally used in manual spray applicators. Removing the metal-to-metal high pressure fluid sealing reduces manufacturing costs associated with the previous mix chamber design. Further, stationary mix chamber 48 can be constructed from a metal or polymer and can be easily removed from spray applicator 12, which reduces downtime and increases productivity. Stationary mix chamber 48 is a simplified and improved mix chamber because in operation stationary mix chamber 48 remains stationary while valve assembly 50 translates, resulting in less moving components within stationary mix chamber 48.

Figure 4A:
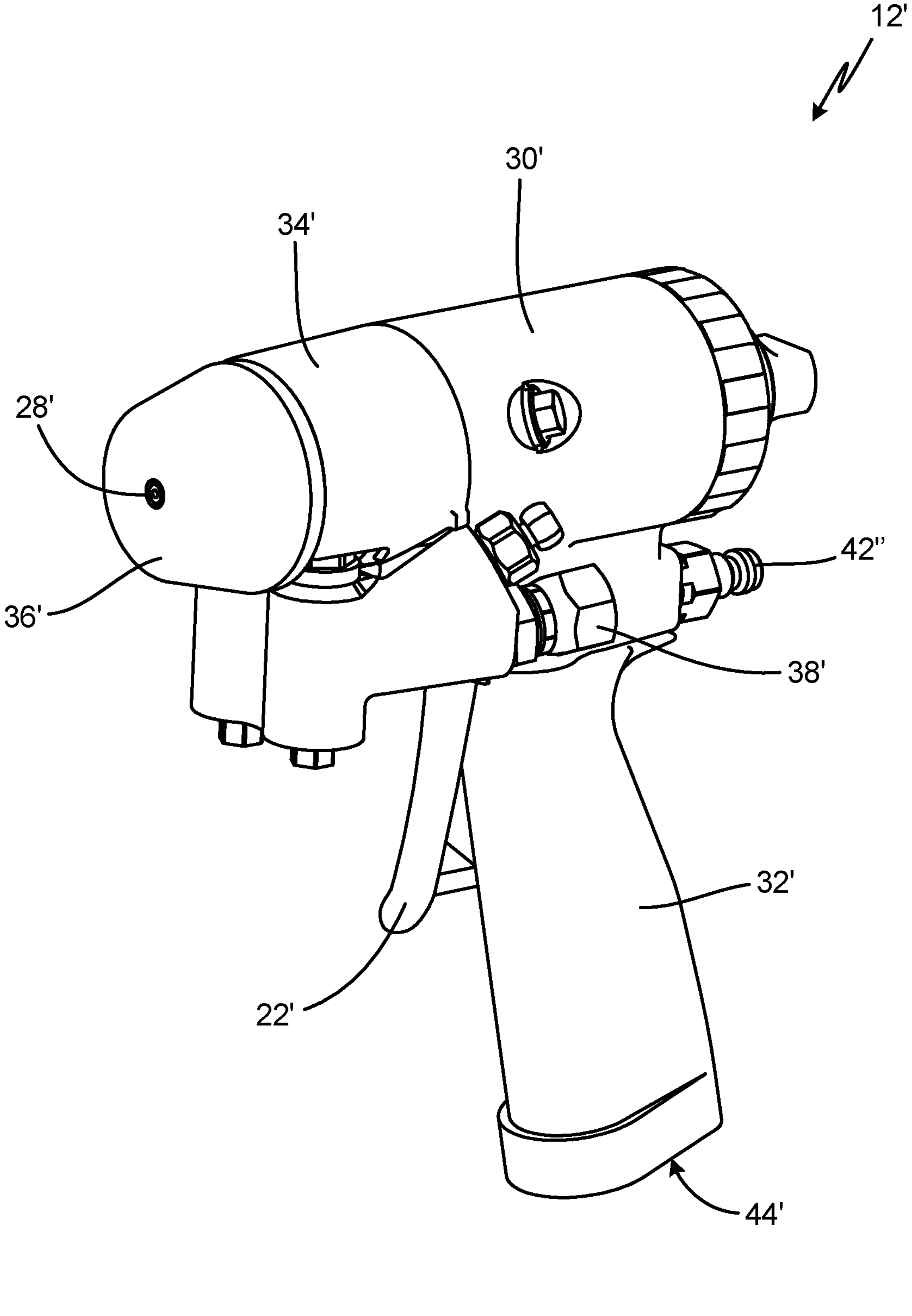
FIG. 4A is a perspective view of a second embodiment of a spray applicator.
Figure 4B:
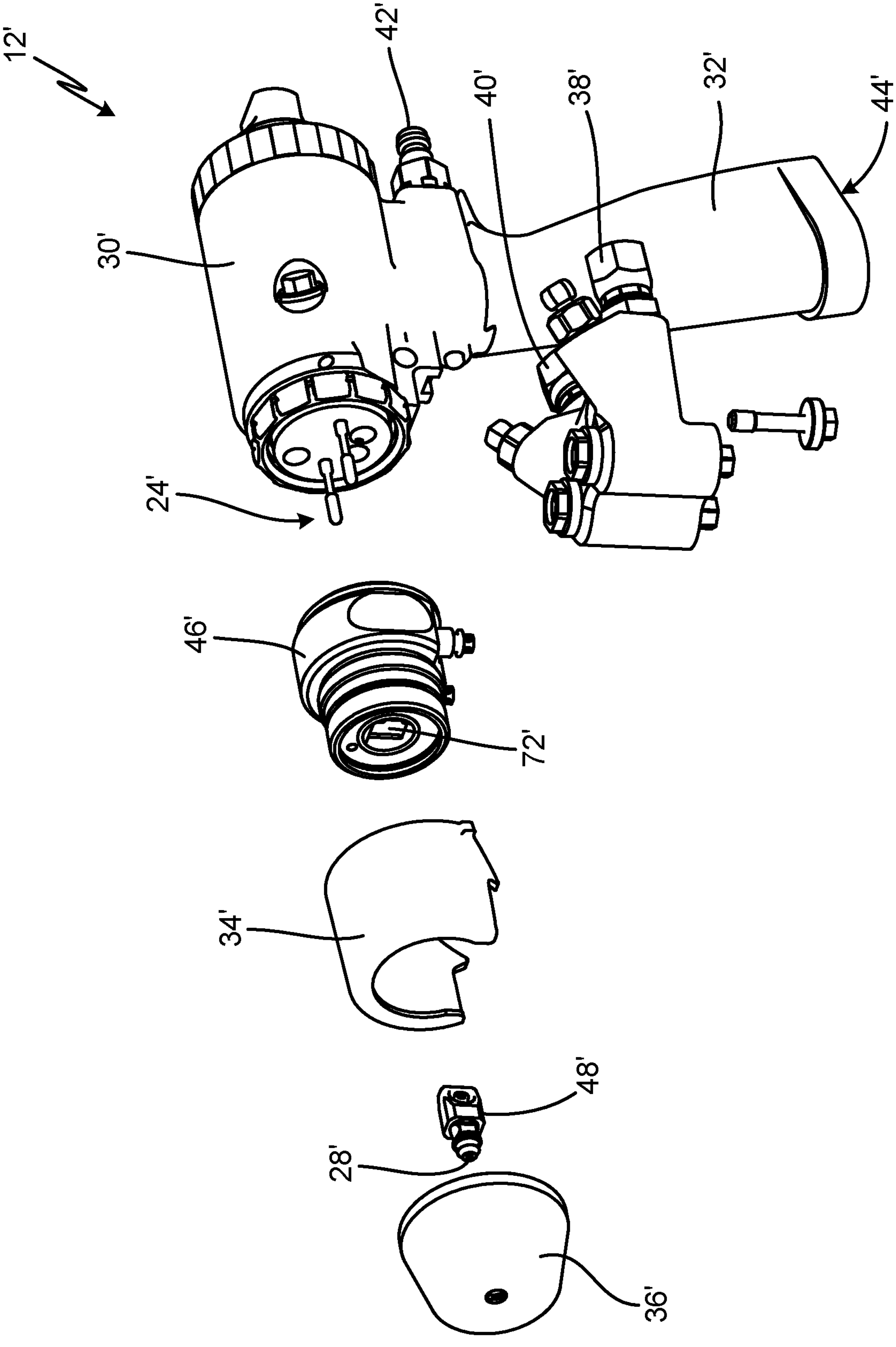
FIG. 4B is an exploded perspective view of the second embodiment of the spray applicator.
Figure 4C:
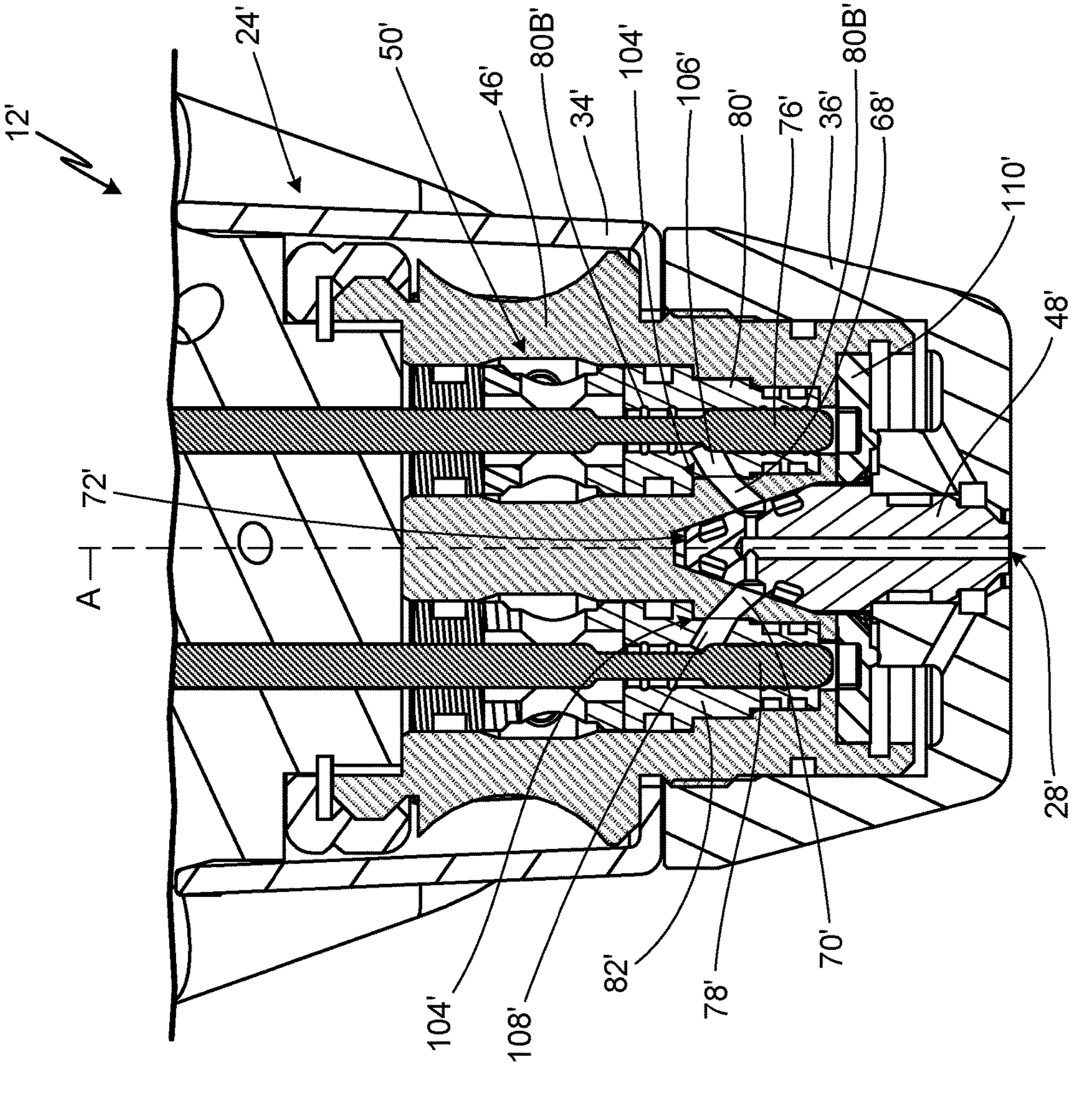
FIG. 4C is a cross-sectional view of the second embodiment of the spray applicator in a fluid open state.
Figure 4D:
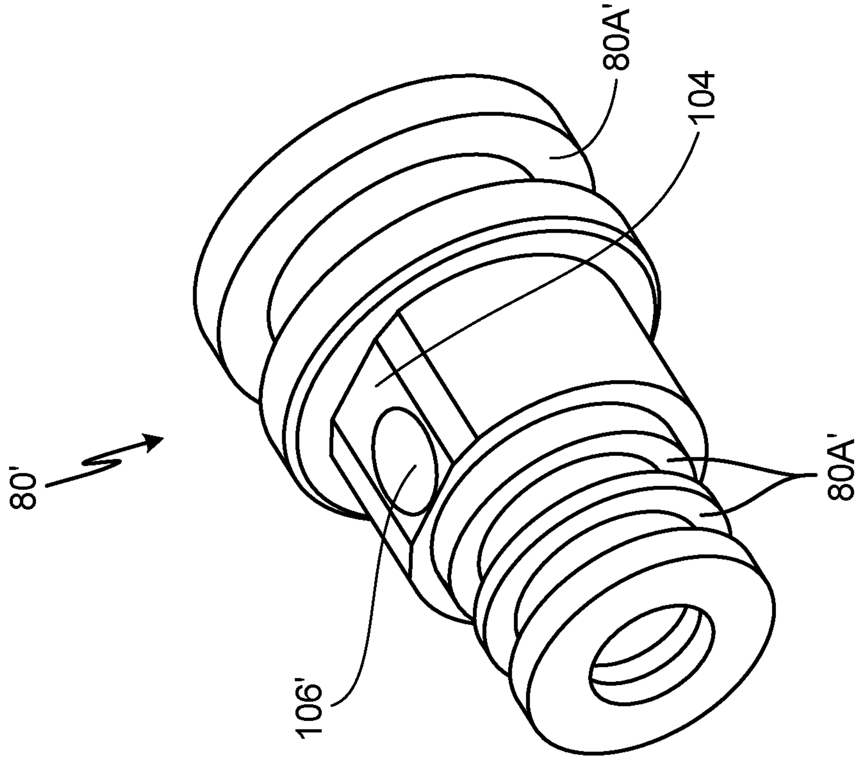
FIG. 4D is a perspective view of a seal used within the second embodiment of the spray applicator.

FIG. 4A is a perspective view of second spray applicator 12'. FIG. 4B is an exploded perspective view of second spray applicator 12'. FIG. 4C is a cross-sectional view of second spray applicator 12' in a fluid open state. FIG. 4D is a perspective view of a seal within second spray applicator 12'. FIGS. 4A-4D will be discussed together. Second spray applicator 12' is substantially similar to spray applicator 12 (FIGS. 1-3C), with a few differences described below and shown in FIGS. 4A-4D. Second spray applicator 12' includes trigger 22', spray valve 24' (FIG. 4B), spray orifice 28', body 30', grip 32', cap 34', retainer cap 36', first fluid manifold 38', second fluid manifold 40', air receiver 42', air exhaust 44', fluid housing 46', and stationary mix chamber 48'.

Body 30' is the main protective housing that covers the internal components of second spray applicator 12'. Further, body 30' provides connection points for the other components of second spray applicator 12'. Grip 32' is connected to body 30' and provides a handle for the user to hold onto while using second spray applicator 12'. Grip 32' also provides cover and protection to internal components of second spray applicator 12'. Trigger 22' is connected to body 30' and configured to control the spraying of second spray applicator 12'. Cap 34' is coupled to body 30' and configured to cover and protect internal components within second spray applicator 12'. Cap 34' is removable from body 30', allowing the user access to the internal components of second spray applicator 12', such as fluid housing 46' and stationary mix chamber 48'. Retainer cap 36' is attached to fluid housing 46' and retainer cap 36' is configured to secure internal components within second spray applicator 12'. More specifically, retainer cap 36' is threaded onto mating threads of fluid housing 46' to secure retainer cap 36' to fluid housing 46' and second spray applicator 12'. Retainer cap 36' is removable from fluid housing 46', allowing the user access to the internal components of second spray applicator 12', such as fluid housing 46' and stationary mix chamber 48'.

First fluid manifold 38' and second fluid manifold 40' are each adjacent and connected to body 30'. First fluid manifold 38' is configured to receive a first fluid from fluid supply **14*a* (FIG. 1), with pump 16*a* (FIG. 1) transferring the first fluid from fluid supply 14*a* to second spray applicator 12'. Second fluid manifold 40' is configured to receive a second fluid from fluid supply 14*b*, with pump 16*b* transferring the second fluid from fluid supply 14*b* to second spray applicator 12'. In the example shown, first fluid manifold 38' and second fluid manifold 40' are formed as a single manifold mounted to second spray applicator 12'. In the embodiment shown, the first fluid and the second fluid can be received by second spray applicator 12', mixed within second spray applicator 12', and then dispensed from spray orifice 28' onto a substrate. In another embodiment, second spray applicator 12' can receive fluid from a single fluid receiver and dispense a single fluid from spray orifice 28'** onto a substrate.

In the embodiment shown, air receiver 42' is connected to a rear portion of grip 32'. In another embodiment, air receiver 42' can be connected to a bottom portion of grip 32'. As such, second spray applicator 12' can include multiple air receivers 42', only one of which is connected to air supply 18 (FIG. 1) at any given time. Air receiver 42' is configured to receive air from air supply 18. In operation, a user connects air supply 18 to air receiver 42' using a hose, tube, pipe, or other standard connection. Air exhaust 44' is disposed at a bottom portion of grip 32'. Air exhaust 44' is configured to expel air from second spray applicator 12' during the translation of spray valve 24'.

In some cases, second spray applicator 12' may require disassembly and replacement of parts. More specifically, the pathways within fluid housing 46' and/or stationary mix chamber 48' can become clogged due to solidified fluid and/or degradation of the internal components and the parts may need to be replaced. To disassemble second spray applicator 12', the user removes retainer cap 36' from fluid housing 46' and then removes cap 34' from fluid housing 46', allowing access to stationary mix chamber 48'. Stationary mix chamber 48' can then be removed from fluid housing 46', and more specifically removed from contoured cavity 72' of fluid housing 46'. With stationary mix chamber 48' removed, the user can remove fluid housing 46' from body 30'. Fluid housing 46' can be removed from body 30' by unthreading fluid housing 46' from mating threads on body 30'. Then fluid housing 46' can be slid over spray valve 24' and removed from body 30' of second spray applicator 12'. When removing fluid housing 46', seals within fluid housing 46' wipe residue from spray valve 24', increasing efficiency during disassembly. Second spray applicator 12' can be assembled by reversing the process. Fluid housing 46' is slid over spray valve 24' and threaded into mating threads of body 30'. Stationary mix chamber 48' is inserted into contoured cavity 72'. Cap 34' is secured to second spray applicator 12' and retainer cap 36' is threaded onto mating threads of fluid housing 46', further pressing mix chamber 48' into contoured cavity 72', enhancing sealing therebetween.

The quick assembly and disassembly of second spray applicator 12' reduces downtime and increases productivity in the event that fluid housing 46' and/or stationary mix chamber 48' need to be removed for repair or removed and replaced. Further, fluid housing 46' contains the seals that engage spray valve 24', and containment of the multiple components within fluid housing 46' increases efficiency of the assembly and disassembly process. In addition, any crossover of fluid is limited to fluid housing 46' and stationary mix chamber 48', which can be easily replaced.

FIG. 4C illustrates second spray applicator 12' in the fluid open state. The internal components of second spray applicator 12' are substantially similar to the internal components of spray applicator 12 (FIGS. 1-3C). Further, the operation of second spray applicator 12' is substantially similar to the operation of spray applicator 12. Therefore, to avoid a redundant description of the components and operation of second spray applicator 12', only the differences between second spray applicator 12' and spray applicator 12 will be discussed.

As discussed, spray applicator 12 includes first valving seal 80 and first air seal 84, which are configured to sealingly engage with first fluid needle 76. Second spray applicator 12' combines first valving seal 80 and first air seal 84 into a single first seal cartridge 80'. First seal cartridge 80' is positioned within fluid housing 46' and first seal cartridge 80' is configured to sealingly engage with first fluid needle 76' to provide both the sealing functions of first valving seal 80 and first air seal 84 of spray applicator 12. When second spray applicator 12' is in the fluid open state (FIG. 4C), first fluid needle 76' is disengaged from an upper portion of first seal cartridge 80' to allow fluid to flow to stationary mix chamber 48' and first fluid needle 76' is sealingly engaged with a lower portion of first seal cartridge 80' to block purge air from flowing to stationary mix chamber 48'. First fluid needle 76' maintains engagement with first seal cartridge 80' in each of the fluid open state, the fluid closed state, and the intermediate state. First fluid needle 76' maintains engagement with first seal cartridge 80' as first fluid needle 76' transitions between each of the states. As such, first seal cartridge 80' of second spray applicator 12' combines first valving seal 80 and first air seal 84 of spray applicator 12 into a single component. Further, first seal cartridge 80' of second spray applicator 12' is configured to provide the same functionality as first valving seal 80 and first air seal 84 of spray applicator 12.

Likewise, spray applicator 12 includes second valving seal 82 and second air seal 86, which are configured to sealingly engage with second fluid needle 78. Second spray applicator 12' combines second valving seal 82 and second air seal 86 into a single second seal cartridge 82'. Second seal cartridge 82' is positioned within fluid housing 46' and second seal cartridge 82' is configured to sealingly engage with second fluid needle 78' to provide both the sealing functions of second valving seal 82 and second air seal 86 of spray applicator 12. When second spray applicator 12' is in the fluid open state (FIG. 4C), second fluid needle 78' is disengaged from an upper portion of second seal cartridge 82' to allow fluid to flow to stationary mix chamber 48' and second fluid needle 78' is sealingly engaged with a lower portion of second seal cartridge 82' to block purge air from flowing to stationary mix chamber 48'. Second fluid needle 78' maintains engagement with second seal cartridge 82' in each of the fluid open state, the fluid closed state, and the intermediate state. Second fluid needle 78' maintains engagement with second seal cartridge 82' as second fluid needle 78' transitions between each of the states. As such, second seal cartridge 82' of second spray applicator 12' combines second valving seal 82 and second air seal 86 of spray applicator 12 into a single component. Further, second seal cartridge 82' of second spray applicator 12' is configured to provide the same functionality as second valving seal 82 and second air seal 86 of spray applicator 12.

First seal cartridge 80' and second seal cartridge 82' are identical components that provide the same functionality within second spray applicator 12'. The only difference between first seal cartridge 80' and second seal cartridge 82' is the fluid needle that each is configured to engage. The following discussion describes first seal cartridge 80' but the details equally apply to second seal cartridge 80', the details for each will not be repeated to avoid redundant descriptions. As shown in FIG. 4D, first seal cartridge 80' is generally cylindrical in shape and includes a plurality of exterior grooves 80A', a plurality of interior grooves 80B', and flat surface 104'. More specifically, first seal cartridge 80' includes a curved exterior surface with a plurality of exterior grooves 80A' fully surrounding first seal cartridge 80'. Each of the plurality of exterior grooves 80A' is configured to receive a seal member, such as an O-ring seal. The seal members positioned within the each of the plurality of exterior grooves 80A' abut both first seal cartridge 80' and fluid housing 46' to create a sealing interface between the components, preventing fluid flow between first seal cartridge 80' and fluid housing 46'. Further, first seal cartridge 80' includes a plurality of interior grooves 80B' (FIG. 4C), each of the plurality of interior grooves 80B' being configured to receive a seal member, such as an O-ring seal. The seal members positioned within each of the plurality of interior grooves 80B' abut both first seal cartridge 80' and first fluid needle 76' to create a sealing interface between the components, preventing fluid flow between first seal cartridge 80' and first fluid needle 76'.

Flat surface 104' is positioned on the curved exterior surface of first seal cartridge 80' and flat surface 104' is configured to engage a flat surface of fluid housing 46' to prevent rotation of first seal cartridge 80' within fluid housing 46'. Further, flat surface 104' is configured to engage the flat surface of fluid housing 46' to ensure proper alignment and sealing engagement of first seal cartridge 80' with fluid housing 46'. More specifically, flat surface 104' ensures proper sealing alignment of first channel 106' of first seal cartridge 80' with first outlet 68' of fluid housing 46'. First channel 106' extends through first seal cartridge 80' from an interior of first seal cartridge 80' to an outlet aperture formed on flat surface 104'. First seal cartridge 80' of second spray applicator 12' simplifies and reduces the number of components within second spray applicator 12', as compared to spray applicator 12, by combining two components into a single component. The description above regarding first seal cartridge 80' applies to second seal cartridge 82', which is identical to first seal cartridge 80'.

As shown in FIG. 4C, second spray applicator 12' includes puck 110' positioned adjacent an end of fluid housing 46'. Puck 110' includes two air passages, with one adjacent an end of first fluid needle 76' and the other adjacent an end of second fluid needle 78'. The air passages within puck 110' are configured to direct air, received through air receiver 42', to stationary mix chamber 48' to purge any remaining fluid out from stationary mix chamber 48' when second spray applicator 12' is de-triggered. Puck 110' can be constructed from a metal, a polymer, or a composite material. Puck 110' is a removeable component that can be detached from fluid housing 46' to access internal components within fluid housing 46'. Further, puck 110' can be easily removed from fluid housing 46' and replaced in the event that puck 110' is damaged due to clogging of second spray applicator 12'.

Stationary mix chamber 48' and valve assembly 50' within fluid housing 46' remove the need for dynamic metal-to-metal high pressure fluid sealing that is conventionally used in manual spray applicators. Removing the metal-to-metal high pressure fluid sealing reduces manufacturing costs associated with the previous mix chamber design. Further, stationary mix chamber 48' can be constructed from a metal or polymer and can be easily removed from second spray applicator 12', which reduces downtime and increases productivity. Stationary mix chamber 48' is a simplified and improved mix chamber because in operation stationary mix chamber 48' remains stationary while valve assembly 50' translates, resulting in less moving components within stationary mix chamber 48'.

Figure 5A:
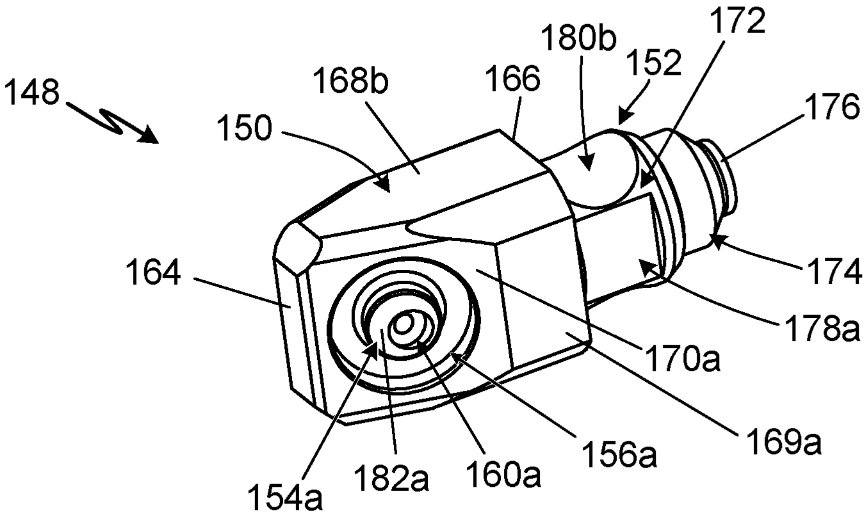
FIG. 5A is a first isometric view of a stationary mix chamber.
Figure 5B:
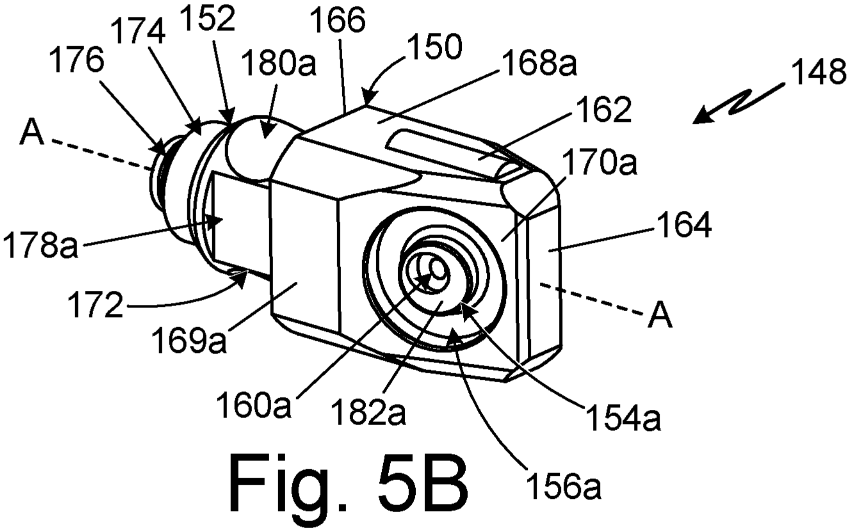
FIG. 5B is a second isometric view of the stationary mix chamber shown in FIG. 5A.
Figure 5C:
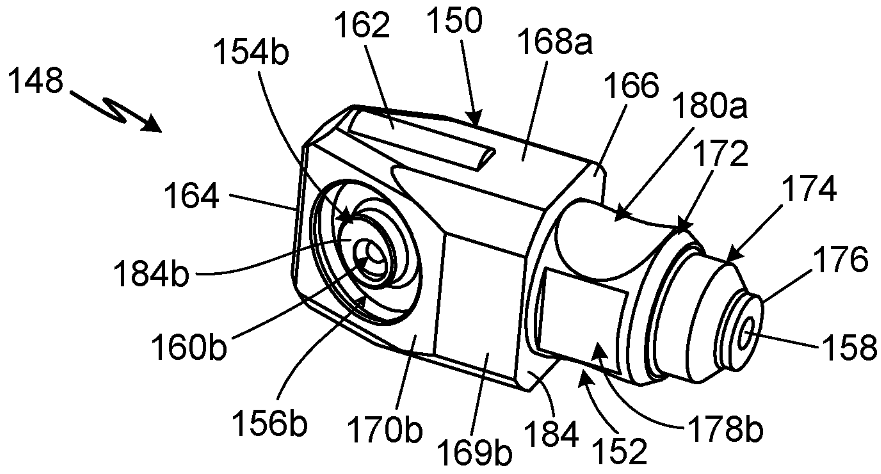
FIG. 5C is a third isometric view of the stationary mix chamber shown in FIG. 5A.
Figure 5D:
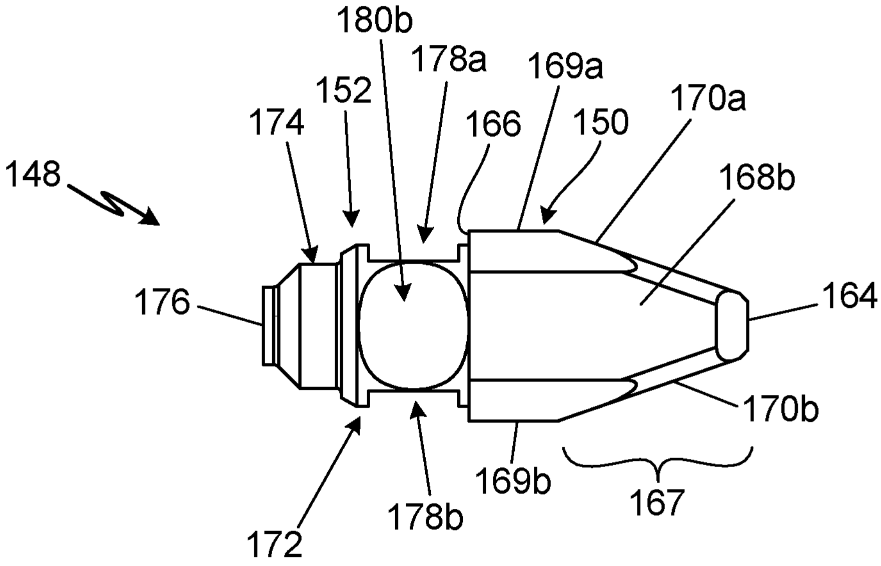
FIG. 5D is a first plan view of the stationary mix chamber shown in FIG. 5A.
Figure 5E:
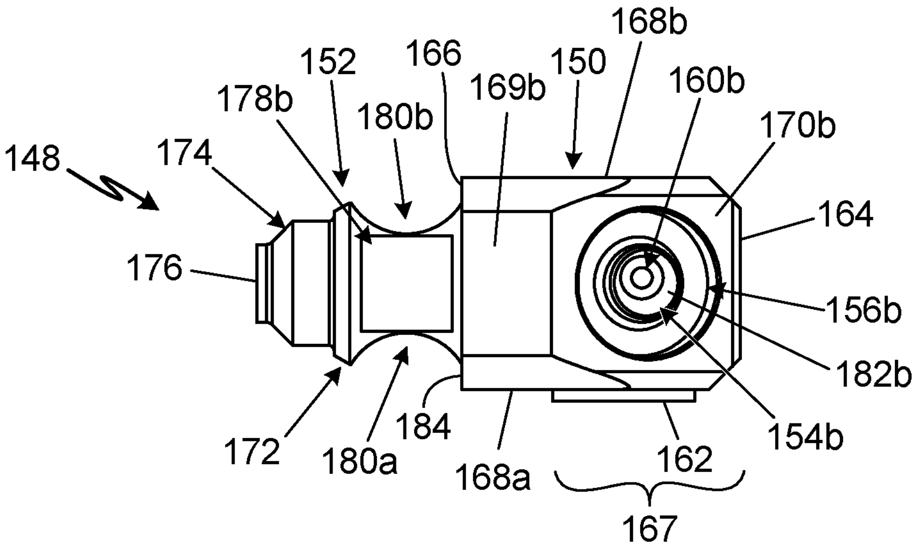
FIG. 5E is a first side view of the stationary mix chamber shown in FIG. 5A.
Figure 5F:
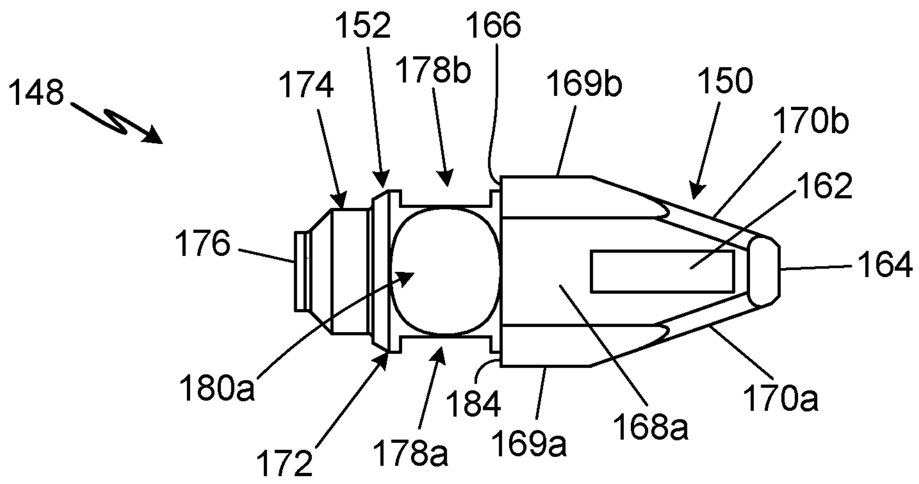
FIG. 5F is a second plan view of the stationary mix chamber shown in FIG. 5A.
Figure 5G:
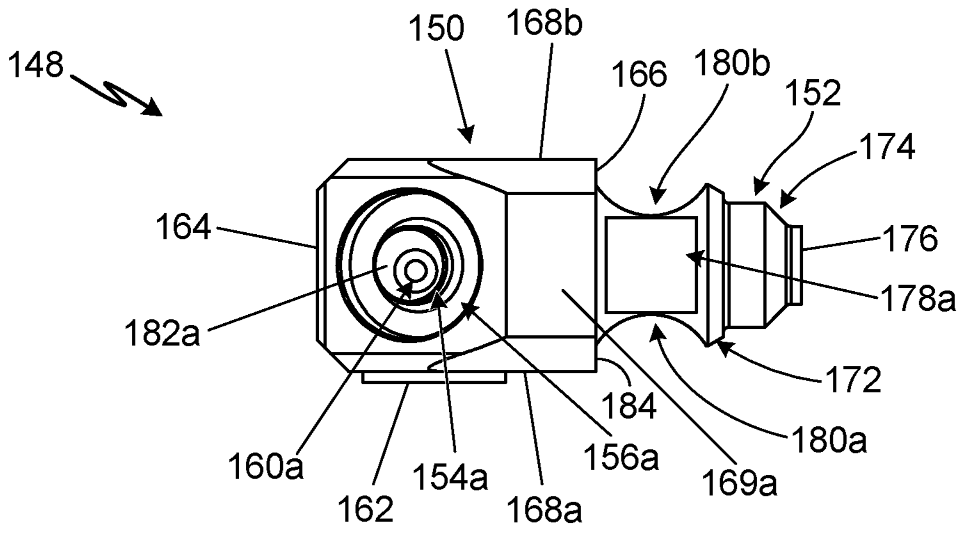
FIG. 5G is a second side view of the stationary mix chamber shown in FIG. 5A.
Figure 5H:
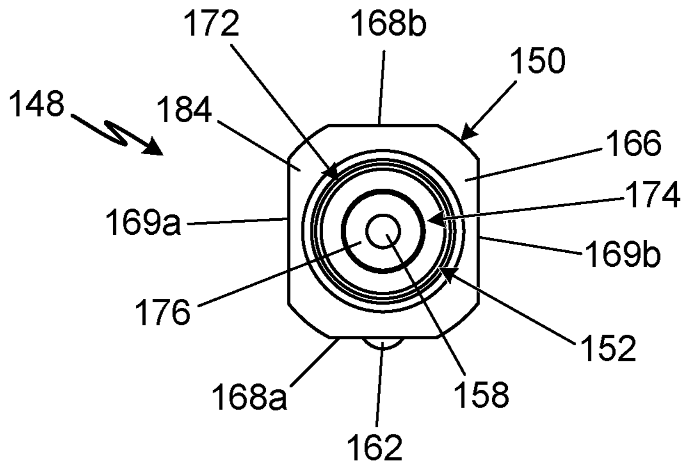
FIG. 5H is a front elevation view of the stationary mix chamber shown in FIG. 5A.

FIG. 5A is a first isometric view of stationary mix chamber 148. FIG. 5B is a second isometric view of stationary mix chamber 148. FIG. 5C is a third isometric view of stationary mix chamber 148. FIG. 5D is a first plan view of stationary mix chamber 148. FIG. 5E is a first side view of stationary mix chamber 148. FIG. 5F is a second plan view of stationary mix chamber 148. FIG. 5G is a second side view of stationary mix chamber 148. FIG. 5H is a front elevation view of stationary mix chamber 148. FIG. SI is a rear elevation view of stationary mix chamber 148. FIGS. 5A-5I will be discussed together. Stationary mix chamber 148 includes body 150; outlet extension 152; posts **154*a*, 154*b*; seal grooves 156*a*, 156*b*; outlet orifice 158; inlet orifices 160*a*, 160*b*; and projection 162. Body 150 includes first end 164; second end 166; flat sides 168*a*, 168*b*; and contoured portion 167 having sloped sides 170*a*, 170*b*. Outlet extension 152 includes first portion 172; second portion 174; outlet boss 176; depressions 178*a*, 178*b*; recesses 180*a*, 180*b*. Post 154*a* includes outer face 182*a* and post 154*b* includes outer face 182*b***.

Stationary mix chamber 148 is configured to be positioned within a cavity formed by a fluid housing 46 and is retained within the chamber by air cap 36. Stationary mix chamber 148 is configured to receive individual component materials through inlet orifices **160*a*, 160*b*. The individual component materials mix within a mixing bore of the mix chamber 148, similar to mixing bore 62. The individual component materials mix to form a plural component material that flows through the mixing bore and is ejected through outlet orifice 158**.

Body 150 extends between first end 164 and second end 166. First end 164 is a smallest width portion of body 150. First end 164 can be a smallest width portion of stationary mix chamber 148. Contoured portion 167 is a portion of body formed at and extending from first end 164. Contoured portion 167 extends from first end 164 to increase a width of the body 150. Contoured portion 167 is configured to interface with the contour of the chamber that receives the mix chamber 148 to facilitate sealing at the interface therebetween. More specifically, sloped sides **170*a*, 170*b* extend from first end 164 and increase the width of body 150. Sloped sides 170*a*, 170*b* are sloped to interface with the contour of the chamber that stationary mix chamber 148 is disposed within. Sloped sides 170*a*, 170*b* extend from first end 164 to flats 169*a*, 169*b*. Flats 169*a*, 169*b* extend between the second end 166 and sloped sides 170*a*, 170*b*, respectively. It is understood, however, that in some examples, the sloped sides 170*a*, 170*b* can extend the full length between first end 164 and second end 166. Sloped sides 170*a*, 170*b* can be considered to form the lateral sides of body 150**.

Flat sides **168*a*, 168*b* extend between and connect sloped sides 170*a*, 170*b*. In some examples, a contour, such as a chamfer, is formed between sloped sides 170*a*, 170*b*, and flat sides 168*a*, 168*b* to connect the sides. Flat sides 168*a*, 168*b* can, in some examples, be the upper and lower sides of stationary mix chamber 148, relative to the orientation of spray gun 12. The body 150 can include sloped portions connecting the first end 164 and the flat sides 168*a*, 168*b***.

Projection 162 extends from flat side **168*a*. Projection 162 is elongate along body 150 from first end 164 towards second end 166. Projection is axially elongate along spray axis A-A. Projection 162 is configured to interface with a slot formed on a component of spray applicator 12, such as on fluid housing 46, to provide a keyed interface. The keyed interface facilitates alignment of stationary mix chamber 148 during installation to provide proper alignment of posts 154*a*, 154*b* and ensure that inlet orifices 160*a*, 160*b* are positioned to receive the component materials during spraying. While the keyed interface is described as including projection 162 on stationary mix chamber 148, it is understood that projection 162 can be formed on the component of spray applicator 12 and a slot can be formed on stationary mix chamber 148** to receive the projection.

Seal grooves **156*a*, 156*b* extend into sloped surfaces 170*a*, 170*b*, respectively. Seal groove 156*a* is an annular groove that extends around post 154*a*. Seal groove 156*a* is configured to receive an annular seal, such as an elastomeric seal, such as an o-ring. Inlet orifice 160*a* is formed through post 154*a*. Inlet orifice 160*a* is offset from a centerpoint of outer face 182*a* such that a width of outer face 182*a* between inlet orifice 160*a* and the outer edge of post 154*a* varies circumferentially about inlet orifice 160*a*. Outer face 182*a* of post 154*a* is sloped such that sloped side 170*a* and outer face 182*a*** are disposed on a common plane. Seal groove

Figure 5I:
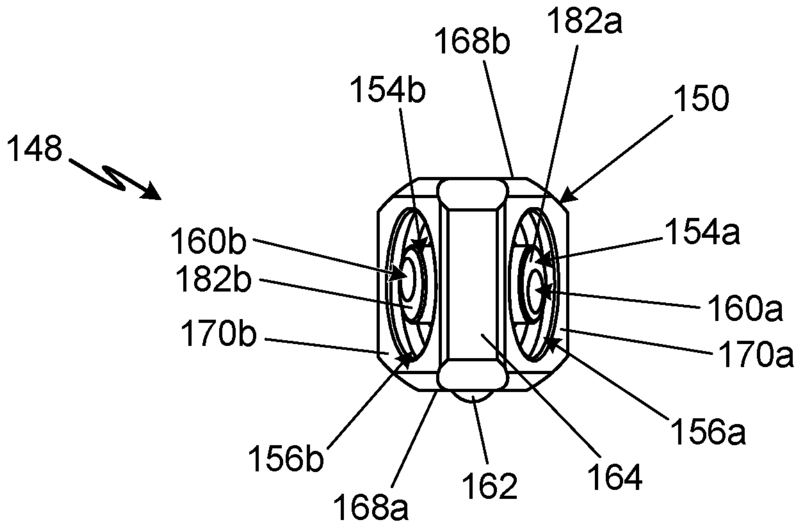
FIG. 5I is a rear elevation view of the stationary mix chamber shown in FIG. 5A.

156*b* is an annular groove that extends around post 154*b*. Seal groove 156*b* is configured to receive an annular seal, such as an elastomeric seal, such as an o-ring. Inlet orifice 160*b* is formed through post 154*b*. Inlet orifice 160*b* is offset from a centerpoint of outer face 182*b* such that a width of outer face 182*b* between inlet orifice 160*b* and the outer edge of post 154*b* varies circumferentially about inlet orifice 160*b*. Outer face 182*b* of post 154*b* is sloped such that sloped side 170*b* and outer face 182*b* are disposed on a common plane. As best seen in FIG. 5I, inlet orifice 160*a* and inlet orifice 160*b* can be vertically offset relative each other.

Chamber face 184 is formed at second end 166 of body 150 and is oriented towards outlet extension 152. Chamber face 184 extends fully around the projection of outlet extension 152. Chamber face 184 extends annularly about axis A-A. Chamber face 184 can be formed as a flat surface disposed on a plane orthogonal to the axis A-A. Chamber face 184 provides a surface by which the stationary mix chamber 148 can be compressed within the cavity of the fluid housing 48. For example, an air cap, similar to air cap 36 and/or air cap 36', can interface with chamber face 184 to drive stationary mix chamber 148 into the receiving cavity.

Outlet extension 152 projects from second end 166 of body 150. First portion 172 of outlet extension 152 is connected to second end 166 and extends between second end 166 and second portion of outlet extension 152. Recesses 180*a*, 180*b* are formed on the outer surface of first portion 172. Recesses 180*a*, 180*b* provide grips for the user to grasp and manipulate stationary mix chamber 148. In the example shown, recesses 180*a*, 180*b* are concave. Recesses 180*a*, 180*b* are smoothly contoured. Depressions 178*a*, 178*b* are formed on the outer surface of first portion 172. Depressions 178*a*, 178*b* provide surfaces at their axial ends that a tool, such as a flathead screwdriver, can interface with to facilitate removal of stationary mix chamber 148 from spray applicator 12. Depressions 178*a*, 178*b* can also be referred to as tool interfaces. Depressions 178*a*, 178*b* are formed with flat, planar bases and axial sides that provides surfaces for the tool to interface with.

Second portion 174 extends from first portion 172 and between first portion 172 and outlet boss 176. Second portion 174 includes a cylindrical portion having a smaller width than first portion 172 at the interface of first portion 172 and second portion 174. Second portion 174 further includes a frustoconical portion extending from the cylindrical portion. Outlet boss 176 extends from the frustoconical portion of second portion 174. The frustoconical portion reduces the width of outlet extension 152 between the cylindrical portion of second portion 174 and outlet boss 176. Outlet orifice 158 is formed through outlet boss 176. Outlet orifice 158 is configured to emit a spray of the plural component material that is mixed within stationary mix chamber 148. Outlet orifice 158 is configured to emit the spray along the spray axis A-A.

During operation, stationary mix chamber 148 is positioned to receive a first component material though inlet orifice 160*a* and a second component material through inlet orifice 160*b*. The first and second component materials mix within a flowpath formed within stationary mix chamber 148. The flowpath extends to outlet orifice 158. The first and second component materials combine in stationary mix chamber 148 to form the plural component material that is emitted as a spray through outlet orifice 158.

Figure 6A:
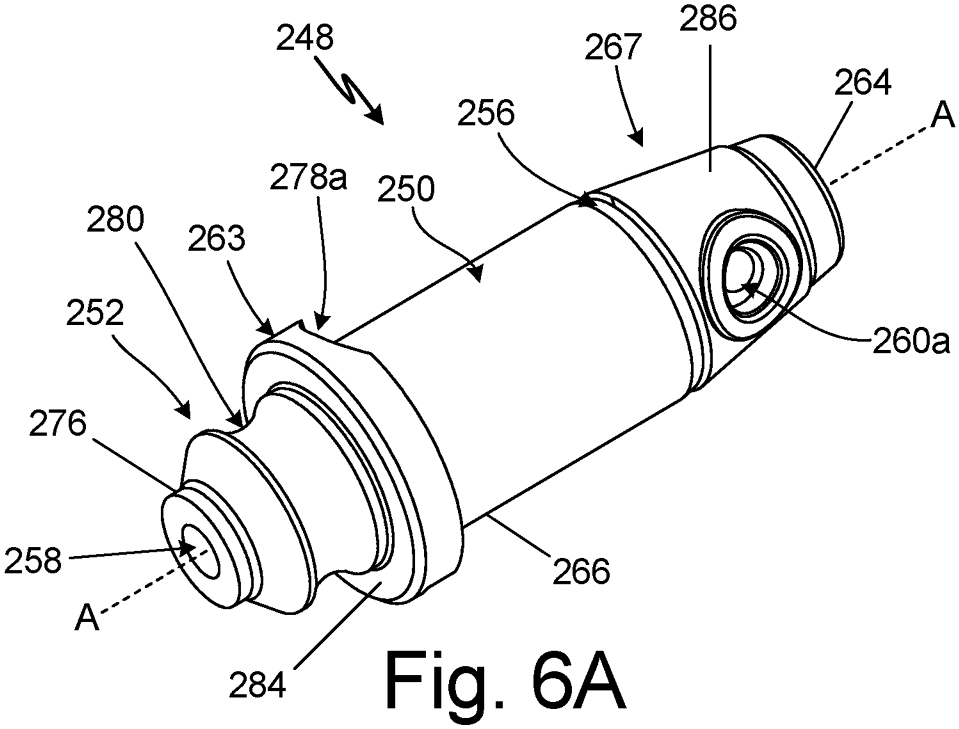
FIG. 6A is a first isometric view of a stationary mix chamber.
Figure 6B:
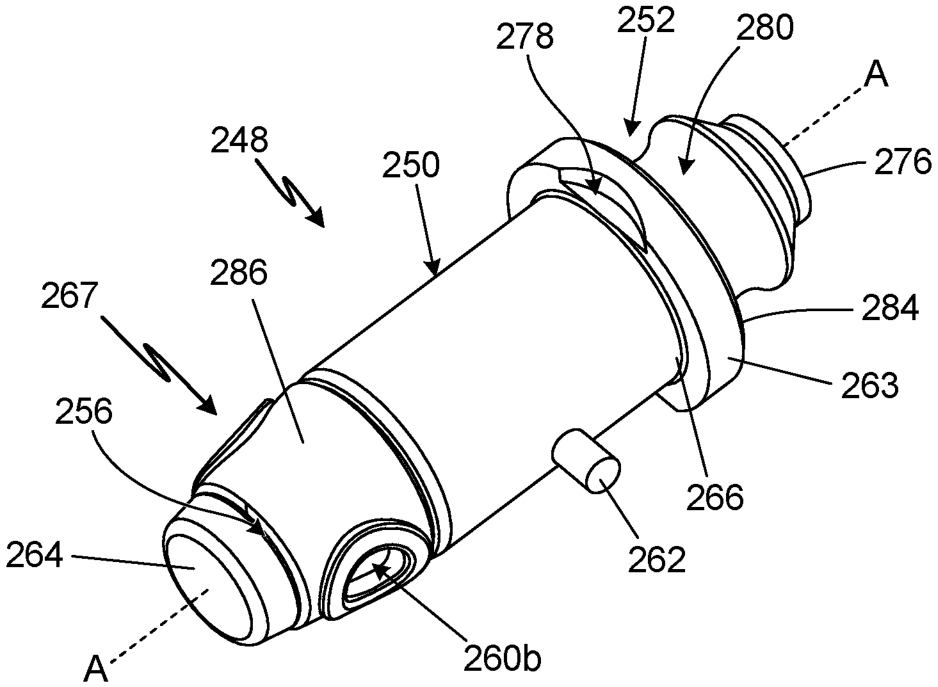
FIG. 6B is a second isometric view of the stationary mix chamber shown in FIG. 6A.
Figure 6C:
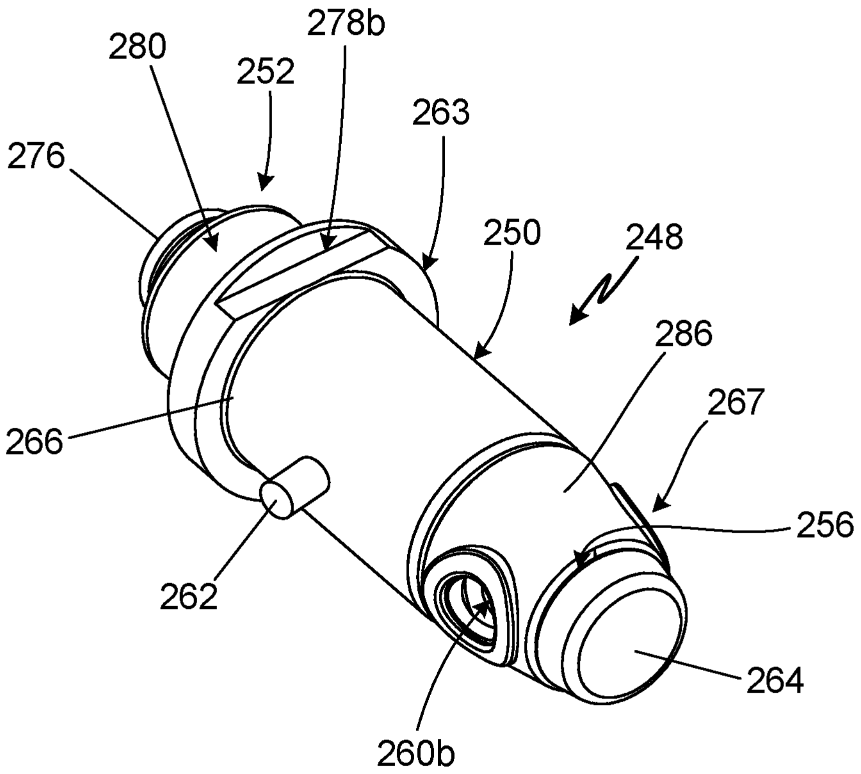
FIG. 6C is a third isometric view of the stationary mix chamber shown in FIG. 6A.
Figure 6D:
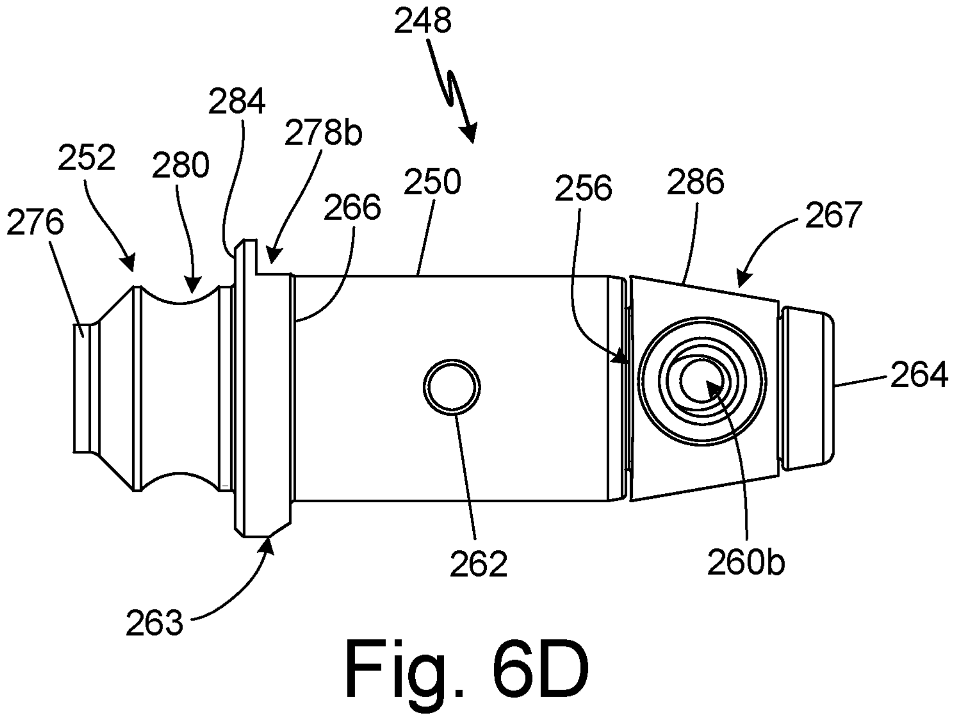
FIG. 6D is a first side view of the stationary mix chamber shown in FIG. 6A.
Figure 6E:
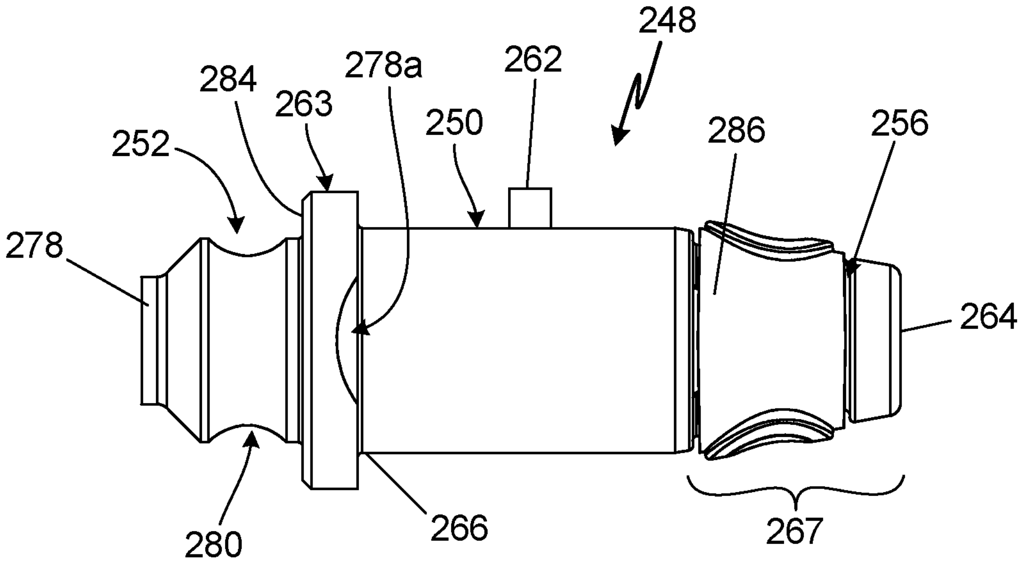
FIG. 6E is a first plan view of the stationary mix chamber shown in FIG. 6A.
Figure 6F:
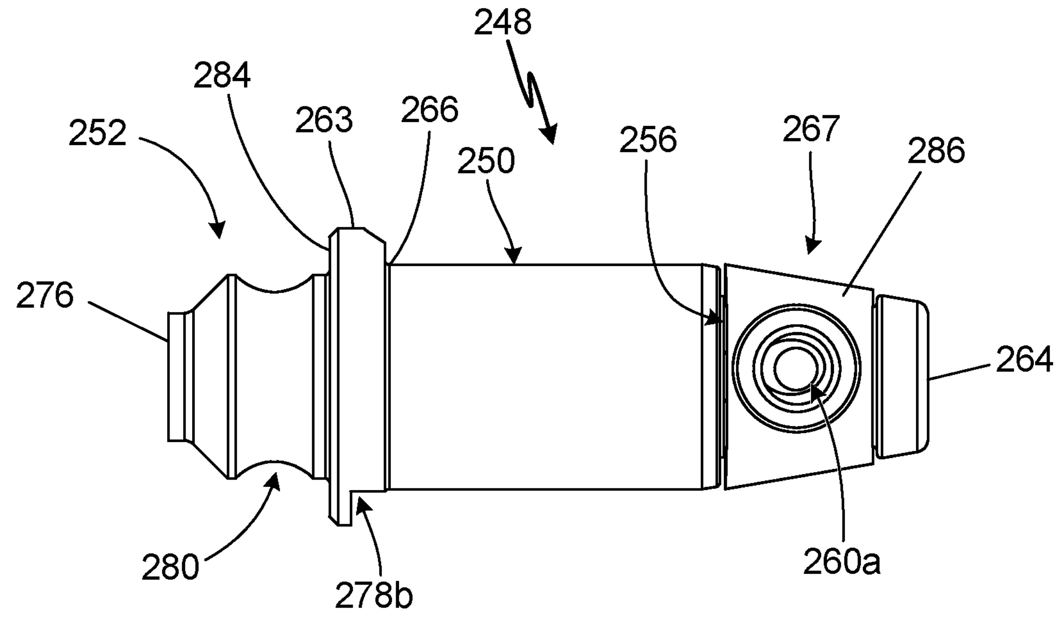
FIG. 6F is a second side view of the stationary mix chamber shown in FIG. 6A.
Figure 6G:
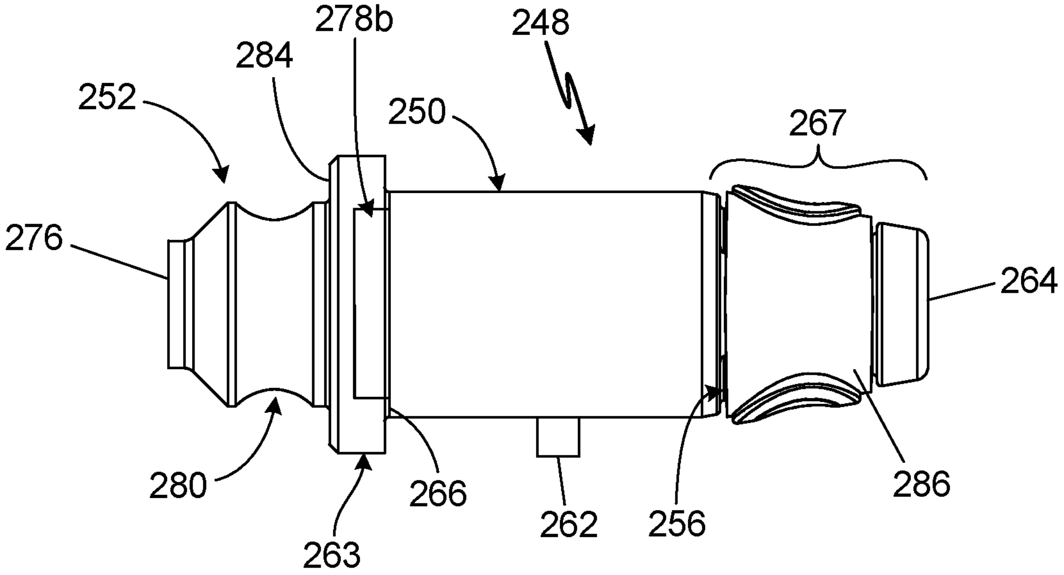
FIG. 6G is a second plan view of the stationary mix chamber shown in FIG. 6A.
Figure 6H:
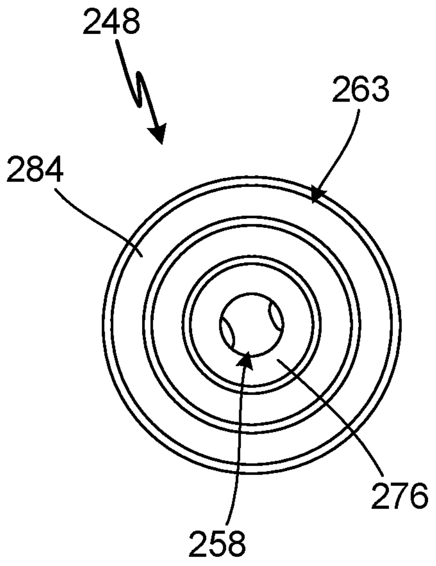
FIG. 6H is a front elevation view of the stationary mix chamber shown in FIG. 6A.
Figure 6I:
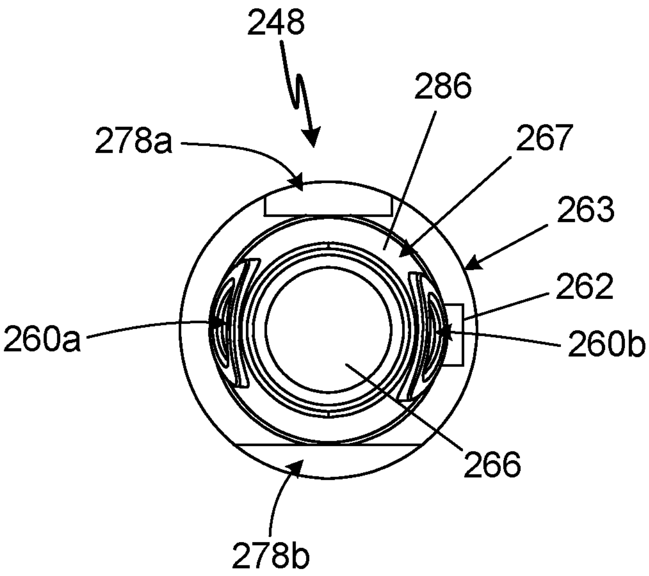
FIG. 6I is a rear elevation view of the stationary mix chamber shown in FIG. 6A.

FIG. 6A is a first isometric view of stationary mix chamber 248. FIG. 6B is a second isometric view of stationary mix chamber 248. FIG. 6C is a third isometric view of stationary mix chamber 248. FIG. 6D is a first side view of stationary mix chamber 248. FIG. 6E is a first plan view of stationary mix chamber 248. FIG. 6F is a second side view of stationary mix chamber 248. FIG. 6G is a second plan view of stationary mix chamber 248. FIG. 6H is a front elevation view of stationary mix chamber 248. FIG. 6I is a rear elevation view of stationary mix chamber 248. FIGS. 6A-6I will be discussed together. Stationary mix chamber 248 includes body 250; outlet extension 252; seal groove 256; outlet orifice 258; inlet orifices 260*a*, 260*b*; projection 262; and body flange 263. Body 250 includes first end 264; second end 266; and contoured portion 267. Outlet extension 252 includes outlet boss 276 and recess 280. Body flange 263 includes depressions 278*a*, 278*b* and chamber face 284. Stationary mix chamber 248 is substantially similar to stationary mix chamber 148 (best seen in FIGS. 5A-5I) and is configured to remain stationary during spraying.

Stationary mix chamber 248 is configured to be positioned within a cavity formed by a fluid housing 46 and can be compressed within the chamber to be secured within the chamber, such as by air cap 36. Stationary mix chamber 248 is configured to receive individual component materials through inlet orifices 260*a*, 260*b*. The individual component materials mix within a mixing bore of the mix chamber 248, similar to mixing bore 62. The individual component materials mix to form a plural component material that flows through the mixing bore and is ejected through outlet orifice 258.

Body 250 extends between first end 264 and second end 266. First end 264 is formed as a smallest width portion of body 250. The distal face of first end 264 can be at a smallest width portion of stationary mix chamber 248, in some examples. Contoured portion 267 is formed as a portion of stationary mix chamber 248 opposite outlet orifice 258. Contoured portion 267 narrows from a main portion of body 250 towards first end 264. Contoured portion 267 is formed as a frustoconical portion of mix chamber 248 that extends to the flat apex formed as the distal face of stationary mix chamber 248 at first end 264. Contoured portion 267 can be considered to include a sloped side that extends annularly about the axis A-A and increases the width of body 250. The sloped side is, in the example shown, partially formed by the body 250 and partially formed by the seal 286 mounted in groove 256.

The width of body 250 increases along contoured portion 267 from first end 264 and towards second end 266. Contoured portion 267 is sloped complimentary with a contour of the chamber that stationary mix chamber 248 is disposed within during spraying. In the example shown, body 250 can be formed as a cylinder between body flange 263 and contoured portion 267. It is understood, however, that body 250 can be configured in any desired manner. In some examples, the contoured portion 267 can extend the full length of body 250 between first end 264 and second end 266. In some examples, body 250 can include non-circular contouring on the exterior surface of the body 250. The non-circular body 250 can interface with a non-circular cavity within the fluid housing to maintain alignment of the stationary mix chamber 248 during mounting of stationary mix chamber 248 and spraying through stationary mix chamber 248. In some examples, the non-circular body 250 can include one or more flat sides. For example, body 250 can include two flat sides and curved or flat sides extending between and connecting those flat sides, among other options.

Projection 262 extends from body 250. Projection 262 extends outward from body 250 and is configured to interface with fluid housing 46 within the cavity of fluid housing 46 that receives the stationary mix chamber 248. For example, projection 262 can interface with a slot. Projection 262 is configured to interface with the portion of the fluid housing 46 to provide a keyed interface therebetween. The keyed interface facilitates alignment of stationary mix chamber 248 during installation and spraying to provide proper alignment of inlet orifices 260*a*, 260*b* to receive the component materials during operation. It is understood that, while projection 262 is shown as extending outward from body 250, in other examples the projection 262 is formed as a slot extending into body 250, such as in examples where body 250 is radially enlarged relative to the largest diameter portion of contoured portion 267, and the slot can receive a projection disposed within the cavity in fluid housing 46.

Groove 256 extends into the body 250 of stationary mix chamber 248. In the example shown, groove 256 is formed on contoured portion 267. The seal groove 256 is an annular groove that extends around axis A-A. Groove 256 is formed annularly about axis A-A. Groove 256 is configured to receive an annular seal 286, such as an elastomeric seal. Seal 286 is disposed within groove 256 and extends fully about axis A-A. Inlet orifice 260*a* is aligned with a first opening through the annular seal 286. Inlet orifice 260*b* is aligned with a second opening through the annular seal 286. The seal 286 interfaces with fluid housing 46 within the cavity to create fluid-tight seals and restrict flow to the inlet orifices 260*a*, 260*b*. The material flows through the openings in the seal 286 and enters into stationary mix chamber 248 through the inlet orifices 260*a*, 260*b*.

Body flange 263 is disposed at second end 266 of body 250. Body flange 263 extends annularly about body 250 and projects radially away from axis A-A. Body flange 263 includes chamber face 284 oriented towards outlet extension 252. Chamber face 284 extends annularly about body 250. Chamber face 284 extends annularly about axis A-A. Chamber face 284 can be formed as a flat surface disposed on a plane orthogonal to the axis A-A. Chamber face 284 provides a surface by which the stationary mix chamber 248 can be compressed within the cavity of the fluid housing 48. For example, an air cap, similar to air cap 36 and/or air cap 36', can interface with chamber face 284 to drive stationary mix chamber 248 into the receiving cavity.

Depressions 278*a*, 278*b* are formed on body flange 263. In the example shown, depressions 278*a*, 278*b* are formed on an opposite axial side of body flange 263 from chamber face 284. In the example shown, depressions 278*a*, 278*b* extend partially through body flange 263 such that depressions 278*a*, 278*b* are not exposed on chamber face 284. Depressions 278*a*, 278*b* provide an axial surface that a tool, such as a flathead screwdriver, can interface with to facilitate removal of stationary mix chamber 248 from spray applicator 12. Depressions 278*a*, 278*b* can also be referred to as tool interfaces.

Outlet extension 252 projects from second end 266 of body 250. Recess 280 is formed on a portion of outlet extension 252. Recess 280 is annular and extends fully about axis A-A in the example shown. In the example shown, recess 280 is concave. Recess 280 provides a grip by which a user can grasp stationary mix chamber 248 to facilitate removal of stationary mix chamber 248 from spray applicator 12.

A frustoconical portion of outlet extension 252 extends between the end of annular recess 280 opposite body 250 and outlet boss 276. Outlet boss 276 extends from the frustoconical portion. The frustoconical portion reduces the width of outlet extension 252 between the annular recess 280 and outlet boss 276. Outlet orifice 258 is formed through outlet boss 276. Outlet orifice 258 is configured to emit a spray of the plural component material that is mixed within stationary mix chamber 248. Outlet orifice 258 is configured to emit the spray along the spray axis A-A. In some examples, outlet extension 252 can include exterior threading to facilitate connection of stationary mix chamber 248 with other components of the sprayer 12. For example, an air cap can be threaded connected to the mix chamber 248. In some examples, the threading is formed on a portion of outlet extension 252 such that recess 280 is disposed axially between the threading and the body flange 263.

During operation, stationary mix chamber 248 is positioned to receive a first component material though inlet orifice 260*a* and a second component material through inlet orifice 260*b*. The first and second component materials mix within a flowpath formed within stationary mix chamber 248. The flowpath extends to outlet orifice 258. The first and second component materials combine in stationary mix chamber 248 to form the plural component material that is emitted as a spray through outlet orifice 258.

Stationary mix chamber 248 can be inserted into the receiving chamber of the spray gun 12 along the axis A-A. In examples including projection 262, the projection 262 is aligned with the portion of spray gun 12 configured to interface with the projection 262, such as a slot. The stationary mix chamber 248 enters into the receiving cavity. The contouring of contoured portion 267 interfaces with mating contouring within the receiving cavity and such an interface limits a distance that the stationary mix chamber 248 can travel into the receiving cavity. The seal 286 interfaces with surfaces within the receiving cavity to form fluid-tight seals therebetween. A compressing component, such as an air cap, interfaces with stationary mix chamber 248, such as at chamber face 284, and exerts an axial force on stationary mix chamber 248 at the chamber face 284. The axial force compresses the seal 286 and ensures the fluid-tight connection and alignment of inlet orifices 260*a*, 260*b* with flowpaths supplying the component materials to the receiving chamber. Spraying can be initiated, such as by pulling trigger 22, and the individual component materials enter into stationary mix chamber 248 though inlet orifices 260*a*, 260*b*. The plural component material formed within the mixing bore of stationary mix chamber 248 is emitted through outlet orifice 258.

Stationary mix chamber 248 can be easily accessed and removed from the spray gun 12 to facilitate cleaning and/or replacement. The compressing component, such as an air cap, is removed from the spray gun 12. The user can grasp mix chamber 248, such as at the recess 280, and pull stationary mix chamber 248 axially out of the receiving cavity. In some examples, such as where the stationary mix chamber 248 becomes stuck or is otherwise difficult to remove, the user can utilize a tool, such as a flathead screwdriver, and interface the tool with one of depressions 278*a*, 278*b* to remove stationary mix chamber 248 from the receiving cavity. The same or a different one of stationary mix chamber 248 can then be installed and the air cap replaced to place spray gun 12 is a state for spraying.

Stationary mix chamber 248 provides significant advantages. Stationary mix chamber 248 is accessible by removing the compressive element retaining stationary mix chamber 248 on spray gun 12. The stationary mix chamber 248 can be accessed, removed, and replaced without disassembling other components of the spray gun 12, reducing downtime and increasing spray operation efficiency. The stationary mix chamber 248 does not move axially along axis A-A during spray operations, preventing wear, increasing the operational life of the stationary mix chamber 248, and ensuring alignment of inlet orifices 260*a*, 260*b* to receive flows from the internal paths within spray gun 12. The contoured portion 267 limits displacement of stationary mix chamber 248 into the receiving cavity, placing inlet orifices 260*a*, 260*b* at desired locations to receive flows. The contoured portion 267 facilitates forming the fluid-tight sealed interface of stationary mix chamber 248 within the receiving cavity, thereby preventing leakage that can cause undesired formation and curing of the plural component material within the receiving cavity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A stationary mix chamber for a plural component sprayer having a sprayer body, a spray valve configured to control flow of first and second component materials to a receiving chamber of the plural component sprayer, and a trigger operatively connected to the spray valve to control actuation of the spray valve to move relative to the receiving chamber and between a first position allowing the first and second component materials to flow to the receiving chamber through first and second flowpaths to place the plural component sprayer in a spray state, respectively, and a second position preventing the first and second component materials from flowing through the first and second flowpaths to the receiving chamber to place the plural component sprayer in a non-spray state, the stationary mix chamber comprising:

a body extending between a first end and a second end and configured to mount within the receiving chamber, wherein the body includes a contoured portion disposed between the first end and the second end, the contoured portion including a first sloped wall that extends annularly about an axis, the first sloped wall configured such that a width of the body increases along the contoured portion as the contoured portion extends between the first end and the second end and towards the second end, the contoured portion configured such that the first end has a smaller width than a width of the contoured portion at an end of the contoured portion opposite the first end;

an outlet extension extending from the second end of the body to a distal end of the outlet extension;

a first inlet port and a second inlet port extending into the first sloped wall of the body, the first inlet port configured to align with the first flowpath with the plural component sprayer in the spray state and in the non-spray state and the second inlet port configured to align with a second flowpath with the plural component sprayer in both the spray state and the non-spray state;

an outlet port formed in the distal end of the outlet extension; and a flowpath extending along an axis and through the body and the outlet extension, the flowpath fluidly connecting the first inlet port to the outlet port and fluidly connecting the second inlet port to the outlet port.

2. The stationary mix chamber of claim 1, wherein the first end has a narrower width than the second end.

3. The stationary mix chamber of claim 1, wherein the first end is tapered.

4. The stationary mix chamber of claim 1, further comprising:

a seal groove formed on the contoured portion, the seal groove configured to receive a seal.

5. The stationary mix chamber of claim 4, wherein the seal groove extends fully about the contoured portion.

6. The stationary mix chamber of claim 1, wherein a projection extends from the body.

7. The stationary mix chamber of claim 6, wherein the projection is cylindrical.

8. The stationary mix chamber of claim 6, wherein the projection is axially elongate along the axis.

9. The stationary mix chamber of claim 1, wherein the outlet extension includes a first portion extending from the second end of the body and a second portion extending from the first portion, and wherein the first portion has a larger width than the second portion at a location where the first portion interfaces with the second portion.

10. The stationary mix chamber of claim 1, further comprising:

a body flange extending from the body.

11. The stationary mix chamber of claim 10, wherein the body flange is disposed at the second end of the body.

12. The stationary mix chamber of claim 1, wherein the contoured portion is frustoconical.

13. The stationary mix chamber of claim 1, wherein the first end of the body is closed such that the flowpath extends partially axially through the body.

14. A stationary mix chamber for a plural component sprayer having a sprayer body, a spray valve configured to control flow of first and second component materials to a receiving chamber of the plural component sprayer, and a trigger operatively connected to the spray valve to control actuation of the spray valve to move relative to the receiving chamber and between a first position allowing the first and second component materials to flow to the receiving chamber through first and second flowpaths to place the plural component sprayer in a spray state, respectively, and a second position preventing the first and second component materials from flowing through the first and second flowpaths to the receiving chamber to place the plural component sprayer in a non-spray state, the stationary mix chamber comprising:

a body extending between a first end and a second end and configured to mount within the receiving chamber;

an outlet extension extending from the second end of the body to a distal end of the outlet extension;

a first inlet port and a second inlet port extending into the body, the first inlet port configured to align with the first flowpath with the plural component sprayer in the spray state and in the non-spray state and the second inlet port configured to align with a second flowpath with the plural component sprayer in both the spray state and the non-spray state;

an outlet port formed in the distal end of the outlet extension; and a flowpath extending along an axis and through the body and the outlet extension, the flowpath fluidly connecting the first inlet port to the outlet port and fluidly connecting the second inlet port to the outlet port;

wherein the body includes a contoured portion disposed between the first end and the second end, the contoured portion extending radially inward relative to the axis and towards the first end such that the first end has a smaller width than a width of the contoured portion at an end of the contoured portion opposite the first end;

wherein a seal groove extends fully annularly about the contoured portion, and the first inlet port is open radially through the seal groove.

15. The stationary mix chamber of claim 14, wherein the seal groove extends in both a first direction along the axis relative to the first inlet port and in a second direction along the axis relative to the first inlet port.

16. A stationary mix chamber for a plural component sprayer having a sprayer body, a spray valve configured to control flow of first and second component materials to a receiving chamber of the plural component sprayer, and a trigger operatively connected to the spray valve to control actuation of the spray valve to move relative to the receiving chamber and between a first position allowing the first and second component materials to flow to the receiving chamber through first and second flowpaths to place the plural component sprayer in a spray state, respectively, and a second position preventing the first and second component materials from flowing through the first and second flowpaths to the receiving chamber to place the plural component sprayer in a non-spray state, the stationary mix chamber comprising:

a body extending between a first end and a second end and configured to mount within the receiving chamber, wherein the first end has a narrower width than the second end, and the body includes a first sloped wall extending from the first end towards the second end, the first sloped wall increasing a width of the body towards the second end, wherein the first sloped wall is annular and the first end is tapered;

an outlet extension extending from the second end of the body to a distal end of the outlet extension;

a first inlet port and a second inlet port extending into the body, the first inlet port configured to align with the first flowpath with the plural component sprayer in the spray state and in the non-spray state and the second inlet port configured to align with a second flowpath with the plural component sprayer in both the spray state and the non-spray state;

an outlet port formed in the distal end of the outlet extension;

a flowpath extending along an axis and through the body and the outlet extension, the flowpath fluidly connecting the first inlet port to the outlet port and fluidly connecting the second inlet port to the outlet port;

a seal groove formed on the first sloped wall; and a seal disposed in the seal groove, wherein the seal extends fully annularly about the body.

17. The stationary mix chamber of claim 16, wherein the seal includes:

a first opening extending through the seal and aligned with the first inlet port; and a second opening extending through the seal and aligned with the second inlet port.

* * * * *